United States Patent
Maeda et al.

(10) Patent No.: US 7,823,209 B2
(45) Date of Patent: Oct. 26, 2010

(54) INFORMATION RECORDING MEDIUM, INFORMATION RECORDING MEDIUM ACCESSING DEVICE, AND AREA SETTING METHOD

(75) Inventors: Takuji Maeda, Osaka (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 1083 days.

(21) Appl. No.: 10/578,372

(22) PCT Filed: Nov. 5, 2004

(86) PCT No.: PCT/JP2004/016421

§ 371 (c)(1), (2), (4) Date: Aug. 4, 2006

(87) PCT Pub. No.: WO2005/045681

PCT Pub. Date: May 19, 2005

(65) Prior Publication Data

US 2007/0113278 A1    May 17, 2007

(30) Foreign Application Priority Data

Nov. 6, 2003    (JP) .............................. 2003-376863

(51) Int. Cl.
G06F 7/04 (2006.01)
G06F 17/30 (2006.01)
H04N 7/16 (2006.01)

(52) U.S. Cl. ........................................ 726/27; 711/171
(58) Field of Classification Search ........................ None
See application file for complete search history.

(56) References Cited

U.S. PATENT DOCUMENTS

| 6,119,118 | A * | 9/2000 | Kain et al. ..................... 707/10 |
| 6,377,958 | B1 * | 4/2002 | Orcutt ......................... 707/200 |
| 6,606,707 | B1 * | 8/2003 | Hirota et al. ................. 713/172 |
| 6,901,497 | B2 | 5/2005 | Tashiro et al. |
| 2003/0163449 | A1 * | 8/2003 | Iwano et al. ................... 707/1 |
| 2003/0221103 | A1 | 11/2003 | Hirota et al. |

(Continued)

FOREIGN PATENT DOCUMENTS

EP    1050887    11/2000

(Continued)

OTHER PUBLICATIONS

English Language Abstract of JP 2003-233795.

(Continued)

*Primary Examiner*—Emmanuel L Moise
*Assistant Examiner*—Nadia Khoshnoodi
(74) *Attorney, Agent, or Firm*—Greenblum & Bernstein, P.L.C.

(57) ABSTRACT

An information recording medium contains a semiconductor memory as a storage device for storing data and having plural areas to be managed by mutually independent file systems, an area information storage for storing information about size and position of each area of the semiconductor memory, a host interface for receiving a command for setting each area size of the semiconductor memory from an accessing device, and an area size setter for setting the size and position of each area of the semiconductor memory. The area size setter sets the area size of each area in the semiconductor memory based on the specified setting condition according to the command received from the accessing device.

19 Claims, 24 Drawing Sheets

U.S. PATENT DOCUMENTS

2005/0216684 A1 9/2005 So et al.
2005/0231765 A1 10/2005 So et al.
2006/0050622 A1 3/2006 So et al.

FOREIGN PATENT DOCUMENTS

| EP | 1331567 | 7/2003 |
| JP | 60-254460 | 12/1985 |
| JP | 63-276626 | 11/1988 |
| JP | 8-272541 | 10/1996 |
| JP | 9-179758 | 7/1997 |
| JP | 2001-014441 | 1/2001 |
| JP | 2001-265626 | 9/2001 |
| JP | 2002-202902 | 7/2002 |
| JP | 2003-233795 | 8/2003 |

OTHER PUBLICATIONS

English Language Abstract of JP 8-272541.
English Language Abstract of JP 63-276626.
English Language Abstract of JP60-254460.
English Language Abstract of JP9-179758.
English Language Abstract of JP 2001-014441.
U.S. Appl. No. 10/546,453 to Inoue et al, which was filed on Feb. 19, 2004.
U.S. Appl. No. 10/577,418 to Maeda et al., which was filed on Apr. 27, 2006.
U.S. Appl. No. 10/578,373 to So et al., which was filed on May 5, 2006.
English Language Abstract of JP 2002-202902.
Optical Storage Technology Association, "Universal Disk Format Specification Revision 1.50", 1997.
English language translation of Bill Ball et al., "Kaitei 3 Han Hyojun Red Hat Linux Reference", Red Hat Kabushiki Kaisha, pp. 58-62, Aug. 1, 2001.
Bill Ball et al., Kaitei 3 Han Hyojun Red Hat Linux Reference (Aug. 1, 2001) pp. 58-62.

* cited by examiner

| AREA INFORMATION STORAGE SECTION | 119 |
|---|---|
| TOTAL CAPACITY OF MEMORY CARD (CS)=10000MB |
| SIZE OF NON-AUTHENTICATION AREA 1 (AS1_D)=2000MB |
| SIZE OF NON-AUTHENTICATION AREA 2 (AS2_D)=7600MB |
| SIZE OF AUTHENTICATION AREA 1 (AS1_P)=20MB |
| SIZE OF AUTHENTICATION AREA 2 (AS2_P)=380MB |
| RATE OF AUTHENTICATION AREA 1 (RT1)=1% |
| RATE OF AUTHENTICATION AREA 2 (RT2)=5% |

(b)

| AREA INFORMATION STORAGE SECTION | 119 |
|---|---|
| TOTAL CAPACITY OF MEMORY CARD (CS)=10000MB |
| SIZE OF NON-AUTHENTICATION AREA 1 (AS1_D)=4000MB |
| SIZE OF NON-AUTHENTICATION AREA 2 (AS2_D)=5675MB |
| SIZE OF AUTHENTICATION AREA 1 (AS1_P)=40MB |
| SIZE OF AUTHENTICATION AREA 2 (AS2_P)=285MB |
| RATE OF AUTHENTICATION AREA 1 (RT1)=1% |
| RATE OF AUTHENTICATION AREA 2 (RT2)=5% |

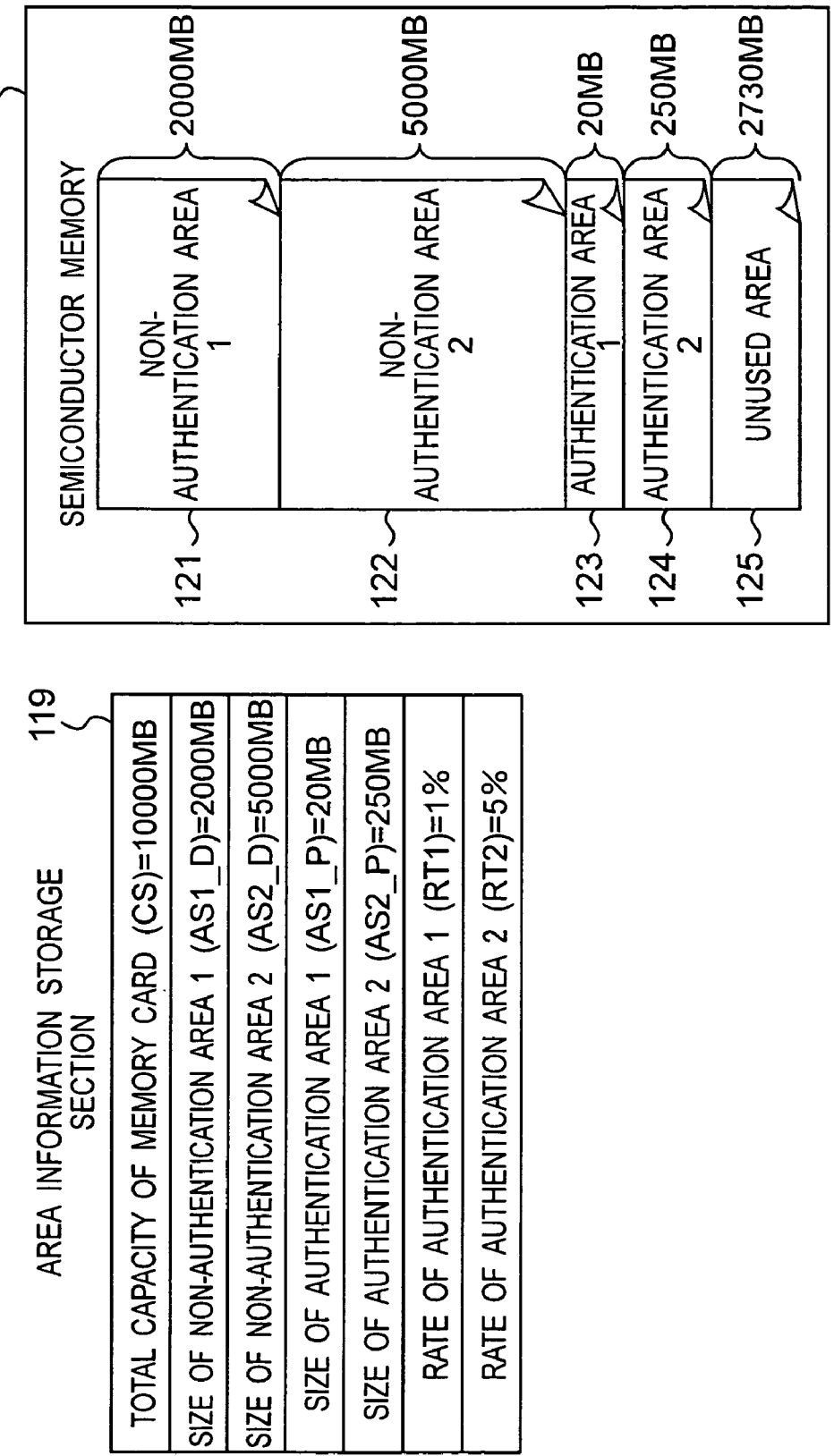

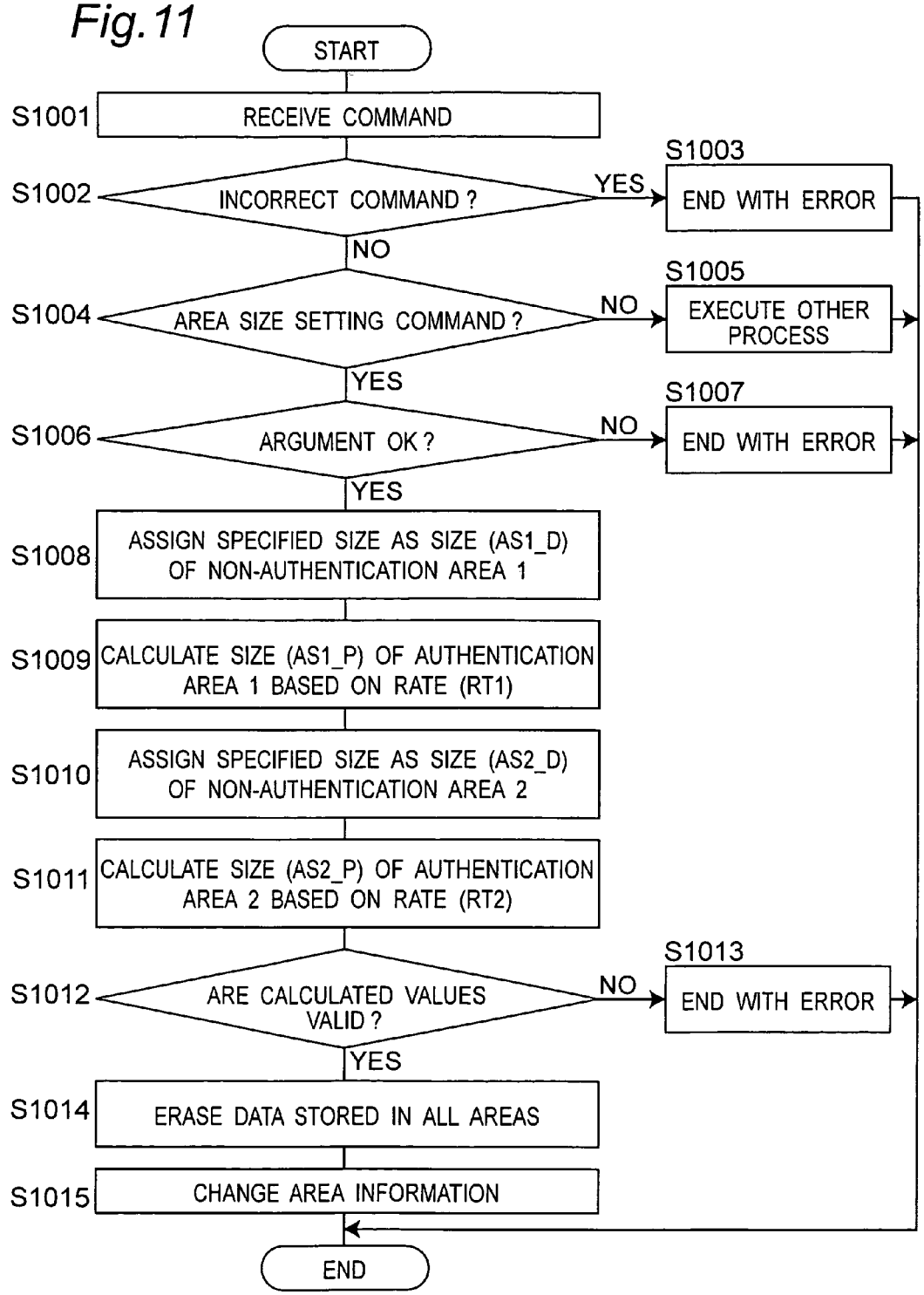

AREA INFORMATION STORAGE SECTION 119

| TOTAL CAPACITY OF MEMORY CARD (CS)=10000MB |
|---|
| SIZE OF NON-AUTHENTICATION AREA 1 (AS1_D)=2000MB |
| SIZE OF NON-AUTHENTICATION AREA 2 (AS2_D)=5000MB |
| SIZE OF AUTHENTICATION AREA 1 (AS1_P)=20MB |
| SIZE OF AUTHENTICATION AREA 2 (AS2_P)=250MB |
| RATE OF AUTHENTICATION AREA 1 (RT1)=1% |
| RATE OF AUTHENTICATION AREA 2 (RT2)=5% |

(b)

AREA INFORMATION STORAGE SECTION 119

| TOTAL CAPACITY OF MEMORY CARD (CS)=10000MB |
|---|
| SIZE OF NON-AUTHENTICATION AREA 1 (AS1_D)=3000MB |
| SIZE OF NON-AUTHENTICATION AREA 2 (AS2_D)=6000MB |
| SIZE OF AUTHENTICATION AREA 1 (AS1_P)=30MB |
| SIZE OF AUTHENTICATION AREA 2 (AS2_P)=300MB |
| RATE OF AUTHENTICATION AREA 1 (RT1)=1% |
| RATE OF AUTHENTICATION AREA 2 (RT2)=5% |

AREA INFORMATION STORAGE SECTION 119

| TOTAL CAPACITY OF MEMORY CARD (CS)=10000MB |
| TOTAL SIZE OF NON-AUTHENTICATION AREAS (TS_D)=8000MB |
| SIZE OF NON-AUTHENTICATION AREA 1 (AS1_D)=1000MB |
| TOTAL SIZE OF AUTHENTICATION AREAS (TS_P)=2000MB |
| SIZE OF AUTHENTICATION AREA 1 (AS1_P)=500MB |

(b)

AREA INFORMATION STORAGE SECTION 119

| TOTAL CAPACITY OF MEMORY CARD (CS)=10000MB |
| TOTAL SIZE OF NON-AUTHENTICATION AREAS (TS_D)=7000MB |
| SIZE OF NON-AUTHENTICATION AREA 1 (AS1_D)=1000MB |
| TOTAL SIZE OF AUTHENTICATION AREAS (TS_P)=3000MB |
| SIZE OF AUTHENTICATION AREA 1 (AS1_P)=500MB |

INFORMATION RECORDING MEDIUM, INFORMATION RECORDING MEDIUM ACCESSING DEVICE, AND AREA SETTING METHOD

TECHNICAL FIELD

The present invention relates to an information recording medium such as semiconductor memory card for managing stored data by a file system, an accessing device for accessing the information recording medium, and an area setting method of the information recording medium.

BACKGROUND ART

Recording media storing digital data of music contents, video data and others are available in various types including magnetic disk, optical disk, and magneto-optical disk. A semiconductor memory card is one of such recording media, and it mainly uses a semiconductor memory such as flash ROM as a storage device, and can be reduced in size of the recording medium, and it has been widely used in a digital still camera, a mobile telephone terminal, and other small portable appliances.

As an example of such a semiconductor memory card, there is a semiconductor memory card having a copyright protection function capable of storing digital copyright object (see, for example, patent document 1). The semiconductor memory card has, in order to protect the copyright of the digital copyright object, an authentication area for allowing access to an external device only when authentication is successful in the external device in the semiconductor memory, and a non-authentication area for allowing access regardless of the result of authentication.

On the other hand, data stored in the semiconductor memory card is managed by a file system, and the user can easily handle the stored data as a file. File systems known hitherto include FAT file system (see non-patent document 1). The FAT system is a file system generally used in personal computers and other information appliances, and is characterized by uniform management of storage position of the data composing a file by a table which is called FAT (File Allocation Table). When data stored in the semiconductor memory card is managed by FAT file system, a device which can interpret the FAT file system can access the data stored in the semiconductor memory card, and data can be exchanged between such devices by way of the semiconductor memory card.

Aside from the FAT file system, file systems also include UDF file system (Universal Disk Format) (see non-patent document 2), and NTFS file system (New Technology File System), if types of file systems that can be interpreted by devices are different, data cannot be exchanged among such devices by way of the semiconductor memory card.

To solve this problem, hitherto, it has been proposed to use an information recording medium which sets an area for storing plural sets of file system management information, and an area for storing common file data (see, for example, patent document 2). In this conventional method, after the information recording medium is loaded in the device, a desired file system is selected, and the area storing file system management information corresponding to the selected file system is accessed with the beginning address as address 0 to read out the file system management information. Thus, by selecting and using any one of the plurality pieces of file system management information, data can be exchanged with a common information recording medium between the devices which interprets different file systems.

Patent document 1: JP-A-2003-233795.
Patent document 2: JP-A-8-272541.
Non-patent document 1: ISO/IEC9293, "Information Technology—Volume and file structure of disk cartridges for information," 1994
Non-patent document 2: "Optical Storage Technology Association (Universal Disk Format Specification Revision 1.50)", 1997.

DISCLOSURE OF INVENTION

Problems that the Invention is to Solve

However, the prior art has the following problem. In the conventional area management method, plural pieces of file system management information are stored corresponding to the file system types, and only one piece of file data which is common to different file systems is stored. When handling the same file with different file systems, it is not required to store a plurality of data entities, and the information storing area can be saved. In this method, however, when editing the file, plural pieces of file system management information corresponding to plural file systems may be changed in batch, and the file can be edited only by a device which can interpret all types of file system management information.

To solve this problem, it may be considered to divide the area in the semiconductor memory card into plural areas, and manage each area by different file systems. In this case, since the type of file system may be different among users, it is preferred that the area size of each area can be set freely for user's convenience.

In a conventional semiconductor memory card having authentication area and non-authentication area, when both authentication area and non-authentication area are divided into plural areas, at least four areas exist in the semiconductor memory card, and thus setting of area size is more complicated.

In the light of this problem, it is hence an object of the invention to present an information recording medium having plural areas managed by mutually independent file systems, that is, an information recording medium capable of setting the size of each area freely, and an accessing device and a area setting method of the information recording medium.

Solving Means

An information recording medium according to the invention is an information recording medium storing data which can be accessed from an accessing device. The recording medium includes: a storage device operable to store data and having plural areas to be managed by independent file systems, an area information storage section operable to store information about size and position of each area of the storage device, a host interface operable to receive a command for setting size of each area of the storage device from the accessing device, and an area size setting section operable to set size and position of each area of the storage device. The area size setting section sets the area size of each area in the storage device based on a predetermined setting condition according to the command received from the accessing device.

In the information recording medium, the host interface may receive the size of one area in the storage device, from the accessing device. The area size setting section can determine the size of the other areas in the storage device on the basis of the received size of the one area and the setting condition, and set information stored in the area information storage section, on the basis of the received value and the determined value.

The information recording medium may further include an authentication controller operable to authenticate the accessing device. The storage device may have an authentication area which allows access from the accessing device only when authentication is successful by the authentication controller, and a non-authentication area which allows access from the accessing device regardless of the authentication result by the authentication controller. The non-authentication area and authentication area individually have plural areas. Each area in the non-authentication area have the corresponding area in the authentication area.

When the information recording medium includes the non-authentication area and the authentication area, information about entire size of the non-authentication area and the authentication area may be stored as the setting condition. The host interface may receive the size of one area in the non-authentication area or authentication area from the accessing device. The area size setting section can determine the size of the other area in the non-authentication area or authentication area on the basis of the received size and setting condition, and set the information to be stored in the area information storage section on the basis of the received value and determined value.

When the information recording medium includes the non-authentication area and the authentication area, information about a ratio of size of an area included in the non-authentication area to size of the corresponding area included in the authentication area may be stored as the setting condition. The host interface receives the size of one area in the non-authentication area or authentication area from the accessing device. The area size setting section can determine the size of each area in the non-authentication area and authentication area on the basis of the received size of one area and the ratio, and set the information to be stored in the area information storage section on the basis of the received value and determined value.

When the information recording medium includes the non-authentication area and the authentication area, information about a ratio of size of an area included in the non-authentication area to size of the corresponding area included in the authentication area may be stored as the setting condition. The host interface receives the size of each area in the non-authentication area or authentication area from the accessing device. The area size setting section can determine the size of each area in the non-authentication area and authentication area on the basis of the received size of each area and the ratio, and set the information to be stored in the area information storage section on the basis of the received value and determined value.

When the information recording medium includes the non-authentication area and the authentication area, the setting condition may be a composition ratio of each area in the non-authentication area or authentication area. The host interface receives the size of each area in one of the non-authentication area and authentication area from the accessing device. The area size setting section can calculate the composition ratio from the received area size, determine the size of each area in the other of the non-authentication area and authentication area on the basis of the composition ratio, and set the information to be stored in the area information storage section according to the received value and determined value.

When the information recording medium includes the non-authentication area and the authentication area, the area information storage section may store plural combinations of sizes of areas included in the non-authentication area and authentication area. The host interface receives a specifying information indicating one combination, from the accessing device. The area size setting section may select the one combination in the area information storage section according to the received specifying information, and set the size of each area in the non-authentication area and authentication area according to the selected combination.

When the information recording medium includes the non-authentication area and the authentication area, the host interface may receive the entire size of at least one of the non-authentication area and authentication area from the accessing device. The area size setting section may set the entire size of the non-authentication area and authentication area on the basis of the received entire size.

The area size setting section may allow only discrete value for an area size that can be set by the accessing device.

The area size setting section may set each area size of the storage device to be larger than the total size of bad blocks which is calculated by the entire size or each area size of the storage device and a rate of good blocks.

In the information recording medium, the size of m areas included in the authentication area, and the size of n areas included in the non-authentication area (m and n are integers of 0 or more, $m+n \geq 2$) may be fixed size.

An accessing device according to the invention is an apparatus for writing and reading data to and from an information recording medium which stores data and having plural areas in which data is managed by independent file systems. The accessing device includes a slot operable to load the information recording medium; and a file system controller operable to control the file systems established on the information recording medium loaded in the slot. The file system controller transmits a command for requesting area size setting to the information recording medium to set the size of each area in the information recording medium, while specifying information about the size of area in the information recording medium.

The file system controller may specify the size of one area in the information recording medium in order to set the size of each area in the information recording medium.

When the information recording medium has an authentication area which allows access only when authentication is successful and a non-authentication area which allows access regardless of authentication result, the non-authentication area and authentication area having plural areas respectively, the file system controller may be configured as follows.

That is, in order to set the size of each area of the information recording medium, the file system controller may specify the size of one area in either one of the non-authentication area and authentication area, to the information recording medium.

Alternatively, in order to set the size of each area of the information recording medium, the file system controller may specify the size of one area in either one of the non-authentication area and authentication area, to the information recording medium.

Alternatively, in order to set the size of each area of the information recording medium, the file system controller may specify the size of each area in either one of the non-authentication area and authentication area, to the information recording medium.

Alternatively, in order to set the size of each area of the information recording medium, the file system controller may specify the size of each area in either one of the non-authentication area and authentication area, to the information recording medium.

Furthermore, when the information recording medium has plural combinations of size of each area of the non-authentication area and authentication area, in order to set each area size of the information recording medium, the file system controller may transmit information for selecting one combination from the plural combinations stored, to the information recording medium.

Alternatively, in order to set the size of each area of information recording medium, the file system controller may specify the entire size of at least one of the non-authentication area and authentication area, to the information recording medium.

The file system controller may specify only discrete value for an area size that can be specified for setting the size of each area of the information recording medium.

The file system controller may set the area size to be specified for setting each area of the information recording medium to be larger than the total size of bad blocks which is calculated by the entire size of the information recording medium or the size of each area in the information recording medium and a rate of good blocks.

An area setting method according to the invention is an area setting method of an information recording medium. The information recording medium has plural areas. Each area stores data which is managed by mutually independent file system. The area setting method includes receiving, from outside of the information recording medium, a command for requesting setting of area size of the information recording medium and specifying information about the area size of the information recording medium, and setting area size of each area in the information recording medium based on a predetermined setting condition, according to the received command.

In the area setting method, the size of one area in the information recording medium may be received from outside. The size of the other area in the information recording medium may be determined on the basis of the received size of one area and the setting condition. The size of each area in the information recording medium may be set on the basis of received value and determined value.

When the information recording medium has an authentication area which allows access by the accessing device only when authentication is successful and a non-authentication area which allows access by the accessing device regardless of the authentication result, and the non-authentication area and authentication area have plural areas respectively, the area setting method may be as follows.

That is, the size of one area in one of the non-authentication area and the authentication may be received. The size of the other area in the one of the non-authentication area and the authentication area may be determined on the basis of the received size and information about entire size of non-authentication area and authentication area. The size of each area of the information recording medium may be set on the basis of the received value and determined value.

Alternatively, size of area in the non-authentication area and information about the ratio of size of area in the non-authentication area to size of the corresponding area in the authentication area, may be stored as a setting condition. The size of one area in one of the non-authentication area and the authentication area may be received. The size of each area of the non-authentication area and the authentication area may be determined on the basis of the received size of one area and the ratio. The size of each area of the information recording medium may be set on the basis of the received value and determined value.

Alternatively, size of area in the non-authentication area and information about the ratio of size of area in the non-authentication area to size of the corresponding area in the authentication area may be stored as a setting condition. The size of each area in one of the non-authentication area and the authentication area may be received. The size of each area of the non-authentication area and the authentication area may be determined on the basis of the received size of each area and the ratio. The size of each area of the information recording medium may be set on the basis of the received value and determined value.

Alternatively, the area setting method may include receiving the size of each area in one of the non-authentication area and the authentication area, calculating composition ratio of each area to the non-authentication area or authentication area from the received size of each area, determining the size of each area in the other of the non-authentication area and the authentication area on the basis of the composition ratio, and setting the size of each area of the information recording medium on the basis of the received value and determined value.

Furthermore, the area setting method may include receiving specific information for selecting one combination, selecting one combination from stored combinations according to the received specific information, and setting each area size of the information recording medium according to the selected combination.

Alternatively, the area setting method may include receiving the entire size of at least one of the non-authentication area and the authentication area, and setting the entire size of the non-authentication area and the authentication area on the basis of the received entire size.

EFFECTS OF THE INVENTION

According to the invention, as for an information recording medium such as a semiconductor memory card having plural areas each managed by mutually independent file systems and a accessing device for accessing the information recording medium, the size of each area in the information recording medium can be set by the accessing device specifying the information about each area size in the information recording medium.

BRIEF DESCRIPTION OF DRAWINGS

FIG. 8(a) is a diagram showing the state of the area information storage section before the area size setting process in embodiment 2, and FIG. 8(b) is a diagram showing the state of the area information storage section after the area size setting process in embodiment 2.

FIG. 10 is a diagram of example of internal structure of the area information storage section and semiconductor memory in embodiment 3.

FIG. 11 is a flowchart of an area size setting process in embodiment 3.

FIG. 12(a) is a diagram showing the state of the area information storage section before the area size setting process in embodiment 3, and FIG. 12(b) is a diagram showing the state of the area information storage section after the area size setting process in embodiment 3.

FIG. 19(a) is a diagram showing the state of the area information storage section before the area size setting process in different areas in embodiment 6, and FIG. 19(b) is a diagram showing the state of the area information storage section after the area size setting process in different areas in embodiment 6.

REFERENCE NUMERALS

Figure 1:
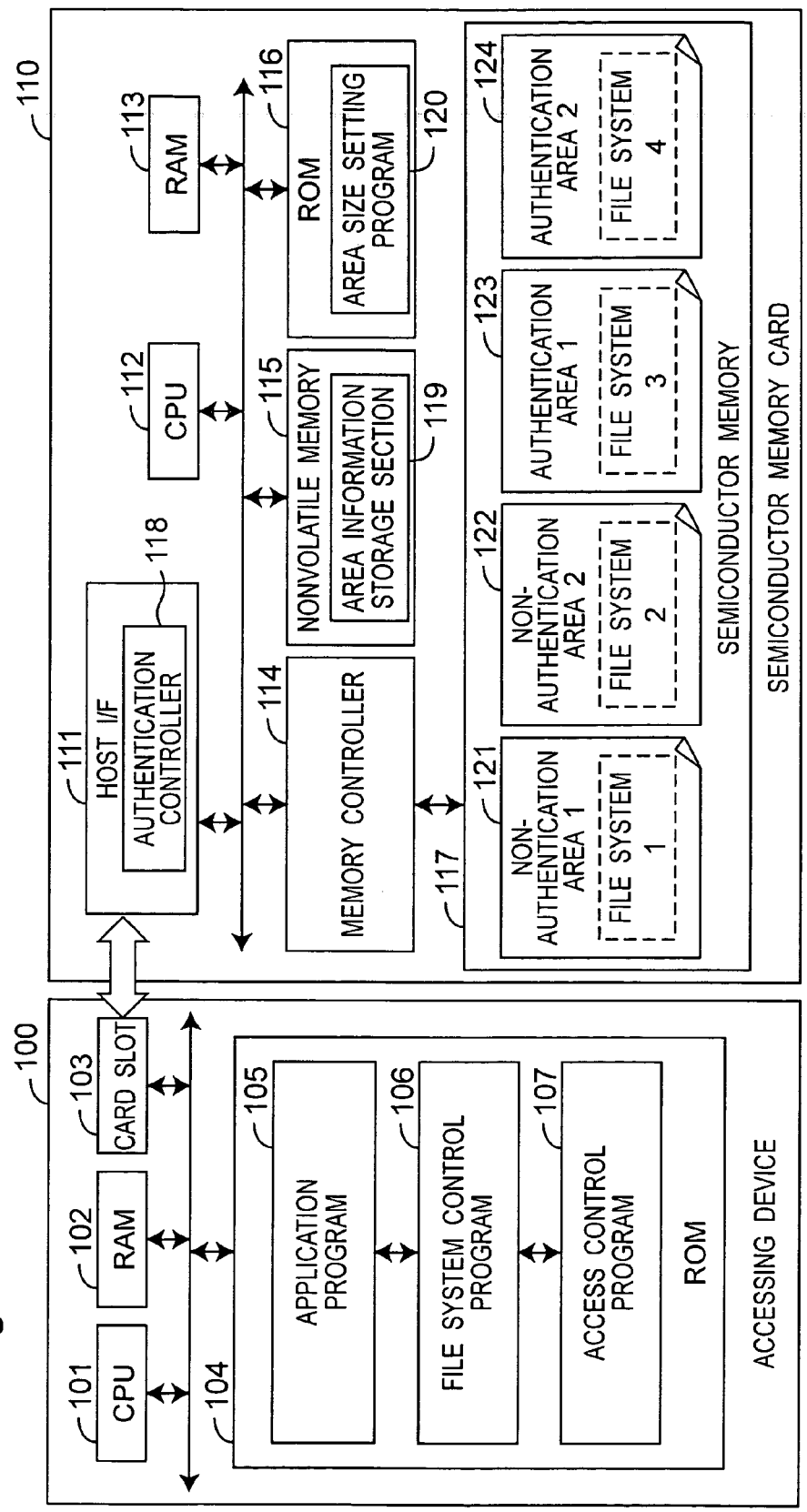
FIG. 1 is a block diagram of a semiconductor memory card and an accessing device of the invention.

100 Accessing device
101, 112 CPU
102, 113 RAM
103 Slot
104, 116 ROM
105 Application program
106 File system control program
107 Access control program
110 Semiconductor memory card
111 Host interface
114 Memory controller
115 Nonvolatile memory
117 Semiconductor memory
118 Authentication controller
119 Area information storage section
120 Area size setting program
121, 122 Non-authentication area
123, 124 Authentication area

BEST MODE FOR CARRYING OUT THE INVENTION

Embodiments of information recording medium and accessing device of the invention are described below with reference to the accompanying drawings.

Embodiment 1

FIG. 1 is a block diagram of a semiconductor memory card and an accessing device in the embodiment of the invention. As shown in FIG. 1, an accessing device 100 includes a CPU 101, a RAM 102, a slot 103, and a ROM 104.

The slot 103 is a section to connect with the semiconductor memory card 110, and loads the semiconductor memory card 110. Control signals and data are exchanged between the accessing device 100 and semiconductor memory card 110 by way of the slot 103.

The ROM 104 stores several programs 105 to 107 for controlling the accessing device 100, and these programs use the RAM 102 as a temporal storage area, and are executed by the CPU 101 to present specified functions.

Specifically, the ROM 104 stores application program 105, file system control program 106, and access control program 107. The application program 105, file system control program 106, and access control program 107 individually control the entire accessing device 100, control the file system built up on the semiconductor memory card 110, and control access of data reading and writing in the semiconductor memory card 110.

Specifically, the application program 105 is a program for controlling the application running on the accessing device 100, and includes a music reproduction program if the accessing device 100 is an audio player, or a still picture imaging program in the case of a digital still camera.

The file system control program 106 cooperates with the CPU 101 to achieve a file system controller, and presents a function of managing and controlling data writing and reading in file unit in the semiconductor memory card 110 (file system control function).

The access control program 107 cooperates with the CPU 101 to achieve an access controller, and presents a function of executing data writing and reading in the logical address space built up on the semiconductor memory card 110 with the specified process start address and specified process size (access control function).

The semiconductor memory card 110 includes a host interface unit 111, a CPU 112, a RAM 113, a memory controller 114, a nonvolatile memory 115, a ROM 116, and a semiconductor memory 117.

The host interface unit 111 is an interface for exchanging control signal and data with the accessing device 100. The host interface unit 111 includes an authentication controller 118 for controlling authentication of the accessing device 100 for accessing the semiconductor memory card 110. The authentication controller 118 permits access to specified recording area in the semiconductor memory 117 by the accessing device 100 only when authentication is successful.

The ROM 116 stores a program (not shown) for controlling the semiconductor memory card 110, and this program uses the RAM 113 as a temporal storage area, and runs on the CPU 112 to present a specified function.

The semiconductor memory 117 has a recording area for storing data, and is connected to the bus to which the host interface 111 and CPU 112 are connected by way of the memory controller 114. The memory controller 114 controls the semiconductor memory 117. The semiconductor memory 117 is divided into plural areas, and each area is managed by individually independent file system.

Plural areas of the semiconductor memory card 110 are divided into a non-authentication area and an authentication area. The authentication area is an area which allows access from the accessing device 100 only when authentication of the accessing device 100 is successful. The non-authentication area is an area which allows access regardless of result of authentication. The non-authentication consists of non-authentication area 1 (121) and non-authentication area 2 (122). The authentication area consists of authentication area 1 (123) and authentication area 2 (124). In these areas 121 to 124, stored data is managed by mutually independent file systems. Herein, the non-authentication area 1 and authentication area 1 form a pair. That is, the authentication area 1 stores authentication data for stored data in the non-authentication area 1. Similarly, the non-authentication area 2 and authentication area 2 form a pair. That is, the authentication area 2 stores authentication data for stored data in the non-authentication area 2. In the following explanation, the non-authentication area 1 and authentication area 1 may be also called "a first area", and the non-authentication area 2 and authentication area 2 may be also called "a second area".

The semiconductor memory card 110 has four areas including, non-authentication area 1 (121), non-authentication area 2 (122), authentication area 1 (123) and authentication area 2 (124). Information about position and size of these areas 121 to 124 is stored in the area information storage section 119 in the nonvolatile memory 115.

The function for setting the size of each area is realized by an area size setting program 120 stored in the ROM 116. That is, the area size setting program 120 cooperates with the CPU 112 to achieve an area size setting section, and presents a function of setting the size of each area (area size setting function) in the semiconductor memory card 110 with a semiconductor memory 117 having plural areas.

Area size setting process by the semiconductor memory card 110 and accessing device 100 thus composed is explained below.

Figure 2:
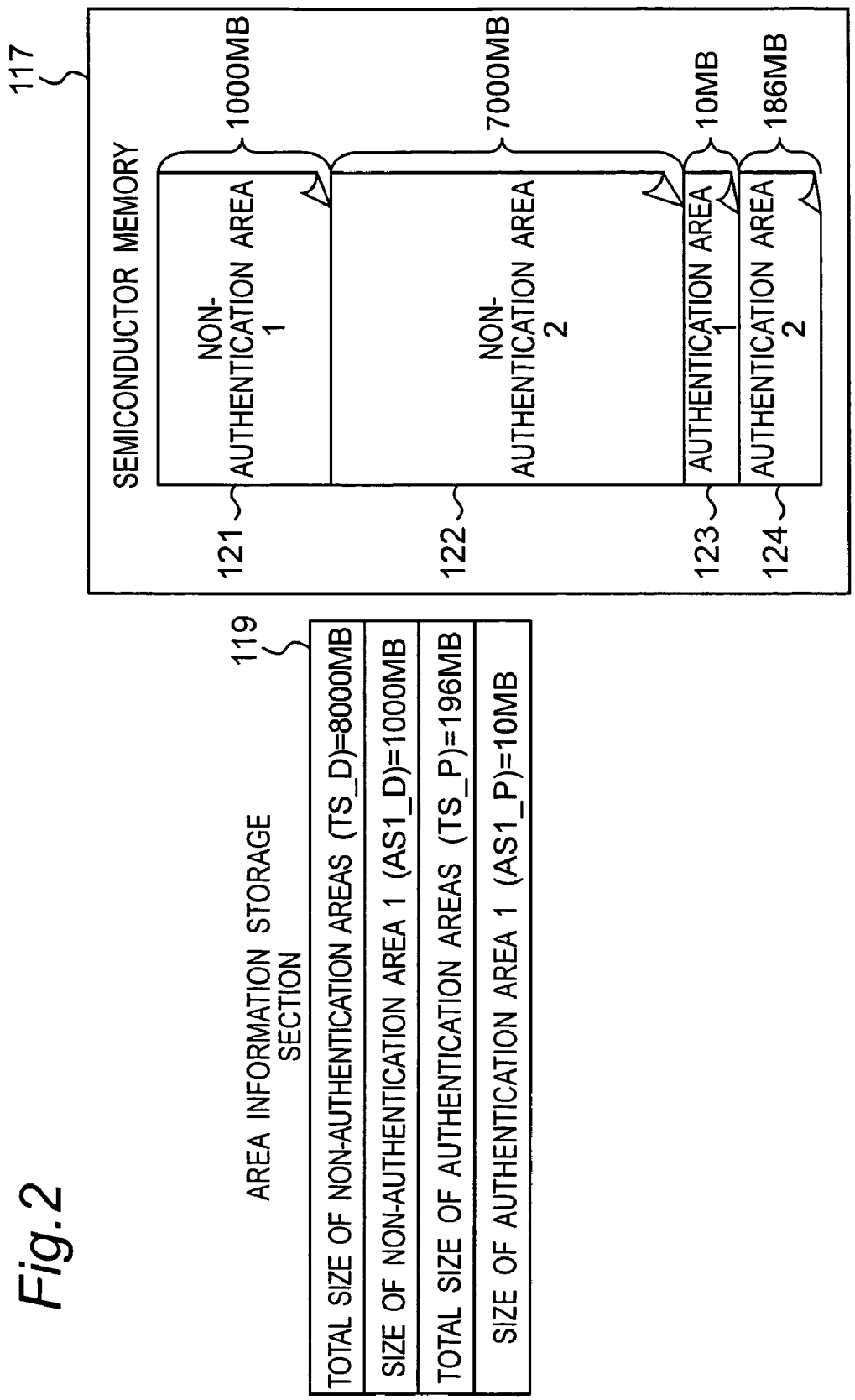
FIG. 2 is a diagram of an example of internal structure of an area information storage section and the semiconductor memory in embodiment 1.

FIG. 2 shows an example of structure of area information storage section 119 and semiconductor memory 117 in this embodiment. The area information storage section 119 stores information about entire (total) size (TS_D) of the non-authentication area existing in semiconductor memory 117, size (AS1_D) of the non-authentication area 1, entire (total) size (TS_P) of the authentication area existing in semiconductor memory 117, and size (AS1_P) of the authentication area 1. Values of entire size of non-authentication area (TS_D) and entire size of authentication area (TS_P) are fixed. In this embodiment, using, as the setting condition, entire size (TS_D, TS_P) of non-authentication area and authentication area of fixed length, allocation of size of first area and second area in the entire non-authentication area or entire authentication area is set with the area size setting command described below.

In the example in FIG. 2, TS_D is 8000 MB (megabytes), and AS1_D is 1000 MB, and thus from these value the size of non-authentication area 2 is calculated to be 7000 MB (=8000−1000 MB). Similarly, TS_P is 196 MB, and AS1_P is 10 MB, and thus from these values the size of authentication area 2 is calculated to be 186 MB (=196−10 MB).

Figure 3:
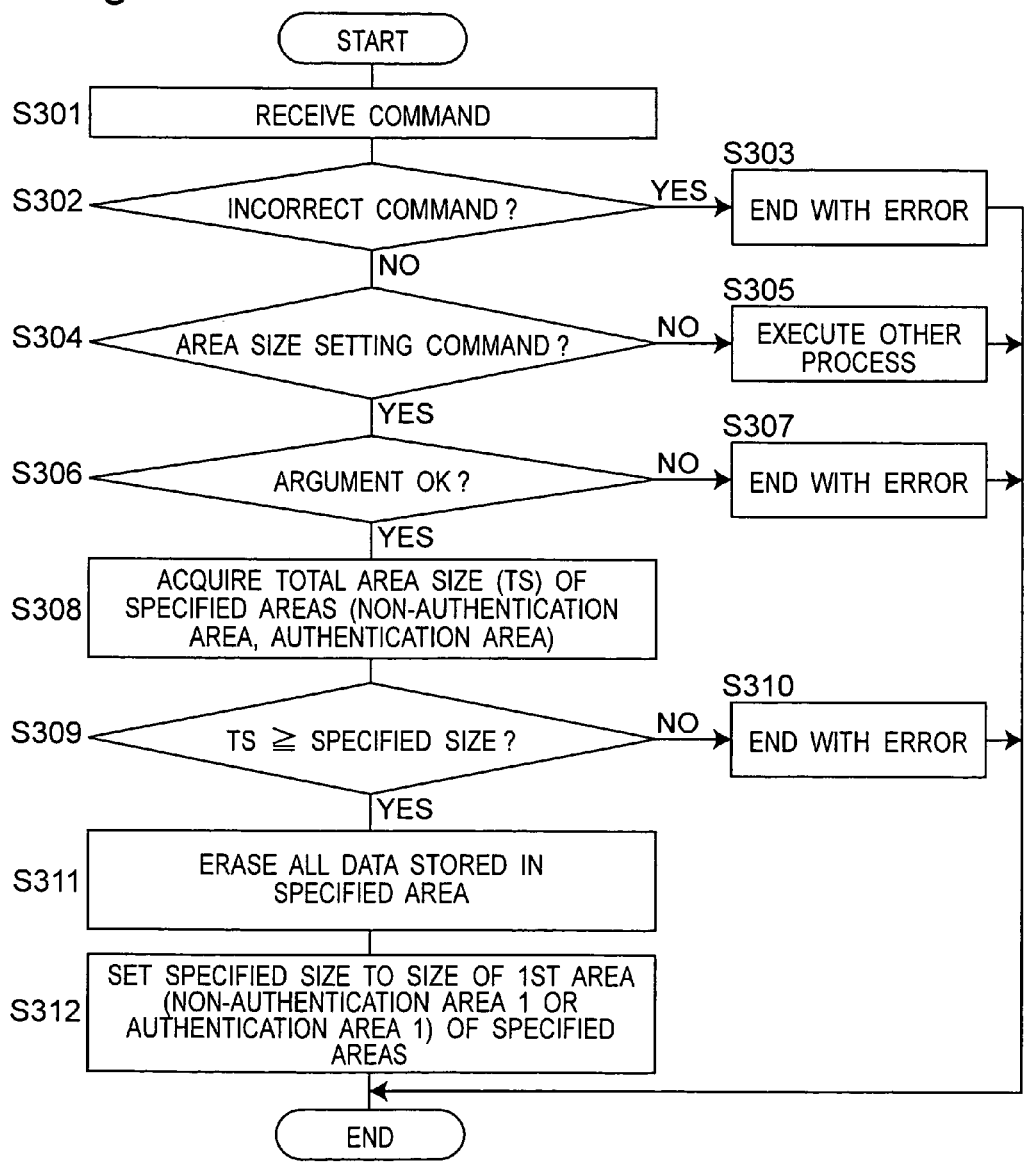
FIG. 3 is a flowchart of an area size setting process in embodiment 1.

Referring now to FIG. 3, area size setting process in the embodiment is explained. Herein, the area size setting process is realized by the area size setting program 120 and CPU 112 in the semiconductor memory card 110.

The area size setting process of the embodiment is executed by the area size setting command (Set_Area_Size command). The area size setting command has the following format.

Set_Area_Size (Size, Area)

The argument "Size" specifies the size of non-authentication area 1 or authentication area 1 of the first area. The argument "Area" specifies the type for area (non-authentication area or authentication area). The command Set_Area_Size sets the size of non-authentication area 1 and non-authentication area 2 in all non-authentication areas, or the size of authentication area 1 and authentication area 2 in all authentication areas.

In the area size setting process in the embodiment, first, the semiconductor memory card 110 receives a command from the accessing device 100 (S301). Referring to the received command, it is judged whether it is an incorrect command which is not recognizable by the semiconductor memory card 110 (S302). If the receive command is an incorrect command, the error is notified to the accessing device 100, and the process is terminated (S303). If the received command is not an incorrect command which can be recognized, it is judged whether the command is an area size setting command or not (S304).

If the received command is other than area size setting command as a result of judging the command, other process corresponding to the command is executed (S305). If the received command is an area size setting command, it is judged whether the argument transferred together with the command is correct or not (S306).

If the argument is judged to be unjust, such as If other area than non-authentication area or authentication area is specified by the argument "Area", the error is notified to the accessing device 100 and the process is terminated (S307).

When the argument is correct, the total area size (TS) of the area of the type specified by "Area" is acquired from the area information storage section 119 (S308). That is, when "non-authentication area" is specified by "Area", it results in TS=TS_D (total non-authentication area size), and when "authentication area" is specified by "Area", it results in TS=TS_P (total authentication area size).

Next, the values of TS and Size are compared (S309). If Size is larger than TS, since area size cannot be set in the value of Size, the error is notified to the accessing device 100 and the process is terminated (S310).

When Size is smaller than TS, all data stored in the area of the type specified by Area is erased (S311). Finally, the size (AS1_D or AS1_P) of first area of the type specified by "Area" stored in the area information storage section 119 is changed to the value specified by "Size", and the process is terminated (S312).

Figure 4:
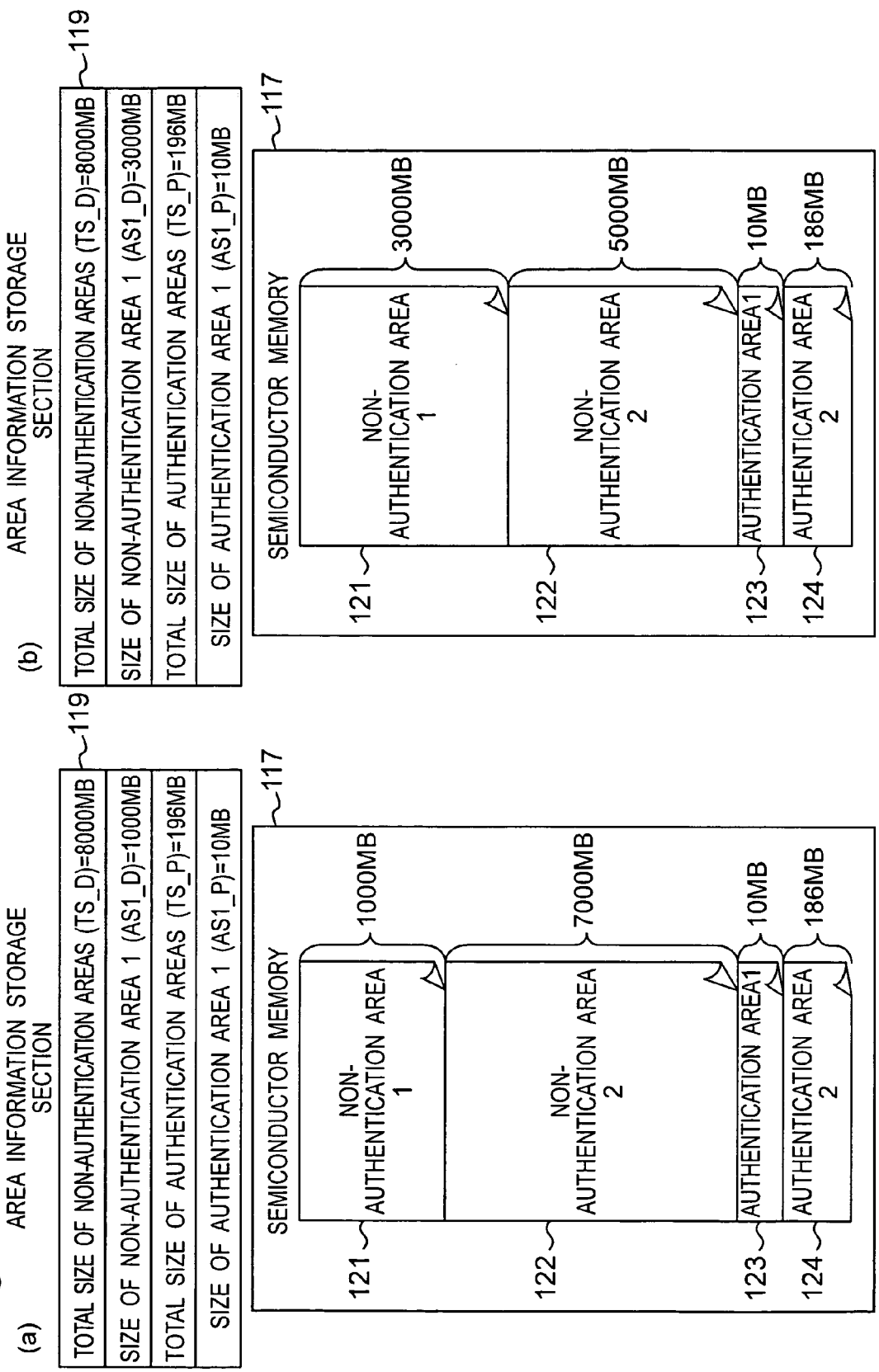
FIG. 4(a) is a diagram showing the state of the area information storage section and semiconductor memory before the area size setting process in embodiment 1.
FIG. 4(b) is a diagram showing the state of the area information storage section and semiconductor memory after the area size setting process in embodiment 1.

FIG. 4 shows an example of state of the area information storage section 119 and semiconductor memory 117 before and after the area size setting process explained in FIG. 3. FIG. 4(a) shows a state before the area size setting process, in which the size (AS1_D) of the non-authentication area 1 is 1000 MB. FIG. 4(b) shows a state after area the size setting process by Set_Area_Size (Size=3000 MB, Area=non-authentication area) from the state in FIG. 4(a). The size of the non-authentication area 1 is changed to 3000 MB, and accordingly the size of the non-authentication area 2 is changed to 5000 MB.

As explained herein, in this embodiment, in the semiconductor memory card 110 having plural recording areas, the information about position and size of each recording area is stored preliminarily in the area information storage section 119, and part of such information is used as area setting condition, and the size of each recording area can be set depending on the request from the accessing device 100. As a result, the size of each area can be flexibly changed depending on the purpose of use of semiconductor memory card 110 which varies in each user.

The nonvolatile memory 115 including the area information storage section 119 may not be provided alone in the semiconductor memory card 110, but may be contained in the semiconductor memory 117.

In the process at step S311 in FIG. 3, all data stored in the area specified by "Area" is deleted, but only necessary portion may be erased, or nothing may be erased if not necessary to erase.

In the process in FIG. 3, authentication process or the like may be added. The command explained in the embodiment is only an example, and other type may be used. For example, without the argument of "Area", different commands may be used in non-authentication area and authentication area. That is, Set_Data_Area_Size (Size) may be used as area size setting command for non-authentication area, while Set_Protected_Area_Size (Size) may be used as area size setting command for authentication area. The argument "Size" may specify not the size of the first area, but the size of the second area. In other method, any other information may be used as far as the size allocation of the first area and the second area can be specified. For example, the ratio of areas may be used. Specifically, when Size=80% is specified by the argument of the area size setting command and TS is 10000 MB, the size of the first area can be calculated as 8000 MB.

The area size setting method of the embodiment operates only on either one of the non-authentication area and the authentication area, and thus the area size setting of the one area does not have influence on the other area. Accordingly, the area size setting method of the embodiment may be applied only in one of the non-authentication area and the authentication area. For example, the method explained in the embodiment may be applied as an area size setting method of the non-authentication area, and size of each area of the authentication area may be set to be fixed length. In this case, the authentication area does not always include two areas of authentication area 1 and authentication area 2, but it may be applied to the semiconductor memory card 110 having a desired number of areas of 0 or more. Similarly, the method explained in the embodiment may be applied as area size setting method of authentication area, and it may be applied to semiconductor memory card 110 having non-authentication area having a desired number of areas of 0 or more.

Figure 5:
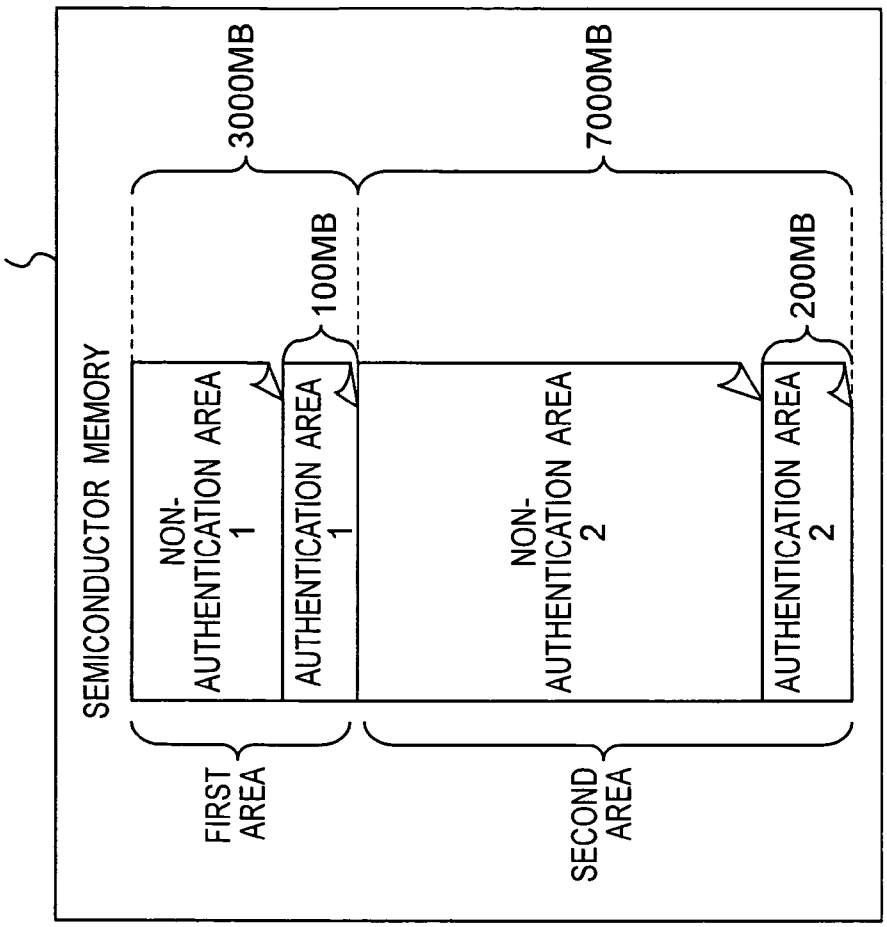
FIG. 5 is a diagram showing other example of the area size setting process in embodiment 1.

In the embodiment, as a setting condition, using the size of total non-authentication area and total authentication area of fixed length, with the area size setting command, the size allocation of the first area and the second area of total non-authentication area or total authentication area can be set. But as the setting condition, using the size of total first area and total second area of fixed length, the size allocation of the non-authentication area and the authentication area in these areas can be set. In this case, as shown in FIG. 5, the area information storage section 119 stores the total first area size (TS_1) and total second area size (TS_2) as fixed values. At this time, in the area size setting command (Set_Area_Size command), for example, the argument "Size" may specify the size of non-authentication area 1 and non-authentication area 2, and the argument "Area" may specify the "first area" or "second area" as the type.

Embodiment 2

In embodiment 1, as the setting condition used in area size setting process, the entire size of non-authentication area or authentication area is used. In the embodiment, the ratio of sizes of areas is used as the setting condition.

Figure 6:
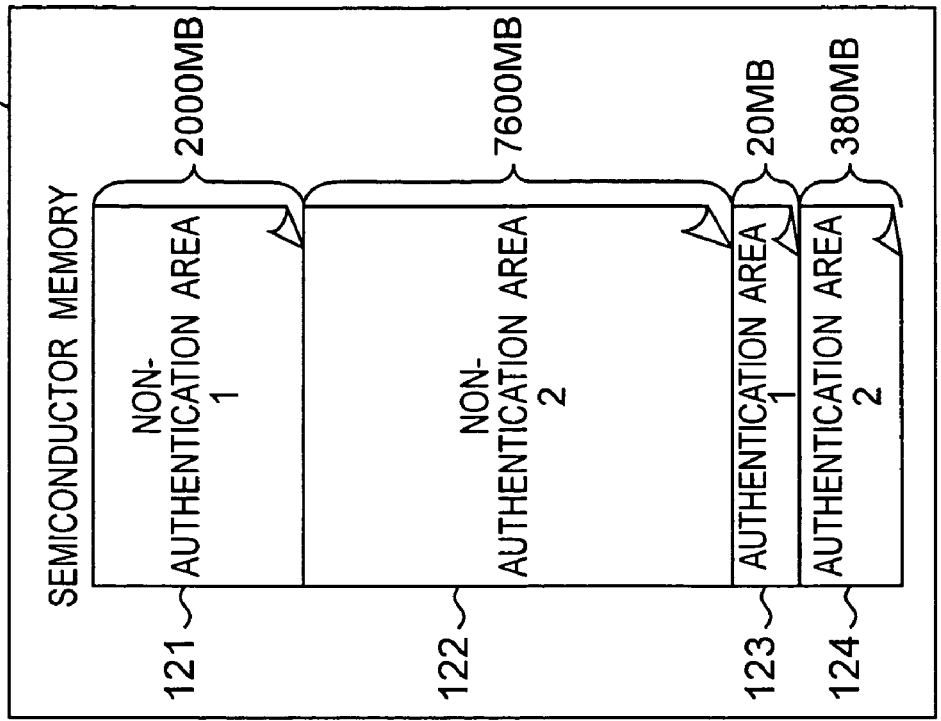
FIG. 6 is a diagram of an example of internal structure of the area information storage section and semiconductor memory in embodiment 2.

FIG. 6 is a diagram of example of structure of the area information storage section 119 and the semiconductor memory 117 in the semiconductor memory card 110 in the embodiment. The structure of the semiconductor memory card and accessing device in the embodiment is same as shown in FIG. 1. As shown in FIG. 6, the area information storage section 119 stores, as information about area size, size (CS) of total area of semiconductor memory, size (AS1_D) of non-authentication area 1, size (AS2_D) of non-authentication area 2, size (AS1_P) of authentication area 1, and size (AS2_P) of authentication area 2.

In this embodiment, the area information storage section 119 also stores, as the setting condition about area size setting process, rate (RT1) of authentication area 1 to non-authentication area 1, and rate (RT2) of authentication area 2 to non-authentication area 2. In the example in FIG. 6, the size (AS1_D) of non-authentication area 1 is 2000 MB, and the rate (RT1) of authentication area 1 is 1%, and hence the size (AS1_P) of authentication area 1 is 20 MB.

In this embodiment, the non-authentication area size and authentication area size are made correlated, and the authentication area size is changed depending on the change in non-authentication area size. In the area size setting process of the embodiment, the size (AS1_D) of non-authentication area 1 is acquired from the accessing device 100. On the basis of the acquired value and the setting condition stored in the area information storage section 119, size (AS2_D) of non-authentication area 2, size (AS1_P) of authentication area 1, and size (AS2_P) of authentication area 2 are determined. As a result, the accessing devices 100 can specify the size of all four areas in the semiconductor memory 117 by specifying the size of one area only.

Figure 7:
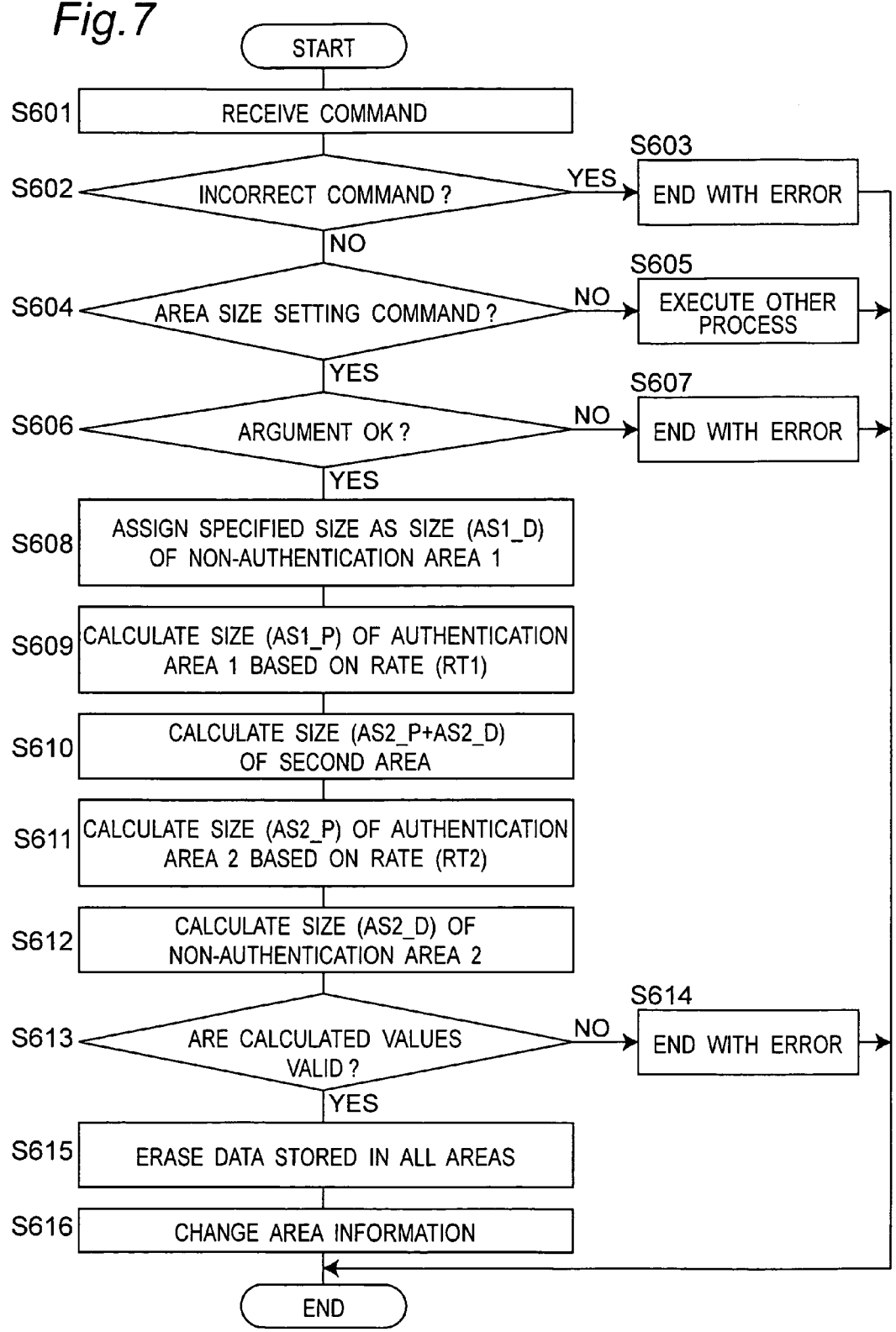
FIG. 7 is a flowchart of the area size setting process in embodiment 2.

Referring to FIG. 7, the area size setting process in the embodiment is explained. The area size setting process in the embodiment is executed by the area size setting function in the semiconductor memory card 110 same as in embodiment 1.

In the area size setting process, first, the semiconductor memory card 110 receives a command from the accessing device 100 (S601). Referring to the received command, it is judged whether it is an incorrect command which is not recognizable by the memory card 110 (S602). If it is an incorrect command, the error is notified to the accessing device 100, and the process is terminated (S603). If it is not an incorrect command, such as when it is a command which can be recognized by the memory card, it is judged whether the command is an area size setting command or not (S604). The area size setting command has the following format, and specifies the size of non-authentication area 1 with the argument "Size".

Set_Area_Size (Size)

If the received command is other than the area size setting command, other process corresponding to the command is executed (S605). If the received command is an area size setting command, it is judged whether the argument transferred together with the command is correct or not (S606). If the argument is judged to be incorrect, such as if a negative number is specified by the argument "Size", the error is notified to the accessing device 100 and the process is terminated (S607). When the argument is correct, the size (AS1_D) of the non-authentication area is temporarily determined as the value of specified Size (S608).

On the basis of the rate of authentication area 1 (RT1) stored in the area information storage section 119, the size (AS1_P) of authentication area 1 is calculated (S609). For example, when AS1_D is 4000 MB, and RT1 is 1%, AS1_P is calculated to be 40 MB (=4000 MB×1%).

Next, the total size of second areas is calculated (S610). The total size of second areas is calculated by subtracting the sum of size (AS1_D) of non-authentication area 1 and size (AS1_P) of authentication area 1 from the card entire capacity (CS). For example, when the card entire capacity (CS) is 10000 MB, AS1_D is 4000 MB, and AS1_P is 40 MB, the total size of second areas is 5960 MB.

On the basis of the calculated total second area size and the rate (RT2) of authentication area 2 stored in the area information storage section 119, the size (AS2_P) of authentication area 2 is calculated (S611). For example, when the total second area size is 5960 MB, and the rate (RT2) of authentication area 2 to non-authentication area 2 is 5%, 5% of the size of non-authentication area 2 supposed to be 100% out of the total second area size is assigned for authentication area 2. Hence, the size (AS2_P) of authentication area 2 is 285 MB (=about 5960 MB×5%/105%). If calculation of AS2_P is accompanied by a remainder, the value of AS2_P is rounded up at intervals of 5 MB.

The size of non-authentication area 2 (AS2_D) is calculated by subtracting the size (AS2_P) of authentication area 2 from the total second area size (S612). In the case of this example, AS2_D is 5675 MB (=5960 MB−285 MB).

Size values of four areas calculated in this procedure are judged to be valid or not (S612). Values are judged to be valid when the total of sizes of four areas does not exceed the card entire capacity (CS) and the value of each area is 0 or more. If the values are invalid, the error is notified to the accessing device 100, and the process is terminated (S614). If valid, data of all areas are erased (S615), and finally the value in the area information storage section 119 is changed (S616).

FIG. 8 shows an example of states of area information storage section 119 before and after the area size setting process explained in FIG. 7. FIG. 8(a) is a diagram before the area size setting process, and FIG. 8(b) is a state after the area size setting process with Set_Area_Size (Size=4000 MB). As shown in FIG. 8(b), the size of each area is set based on the size of non-authentication area 1 specified by area size setting command from the accessing device 100 and the rates (RT1, RT2) stored in the information storage section 119. Method of calculation of values of AS1_D, AS2_D, AS1_P, and AS2_P is as explained with FIG. 7.

In the embodiment, in the semiconductor memory card 110 having plural recording areas, information about ratio of area size between specified recording areas is stored preliminarily in the area information storage section 119 as area setting condition. According to the request from the accessing device 100, the size of each recording area can be set automatically using the area size specified by the accessing device 100 and the area setting condition.

Figure 9:
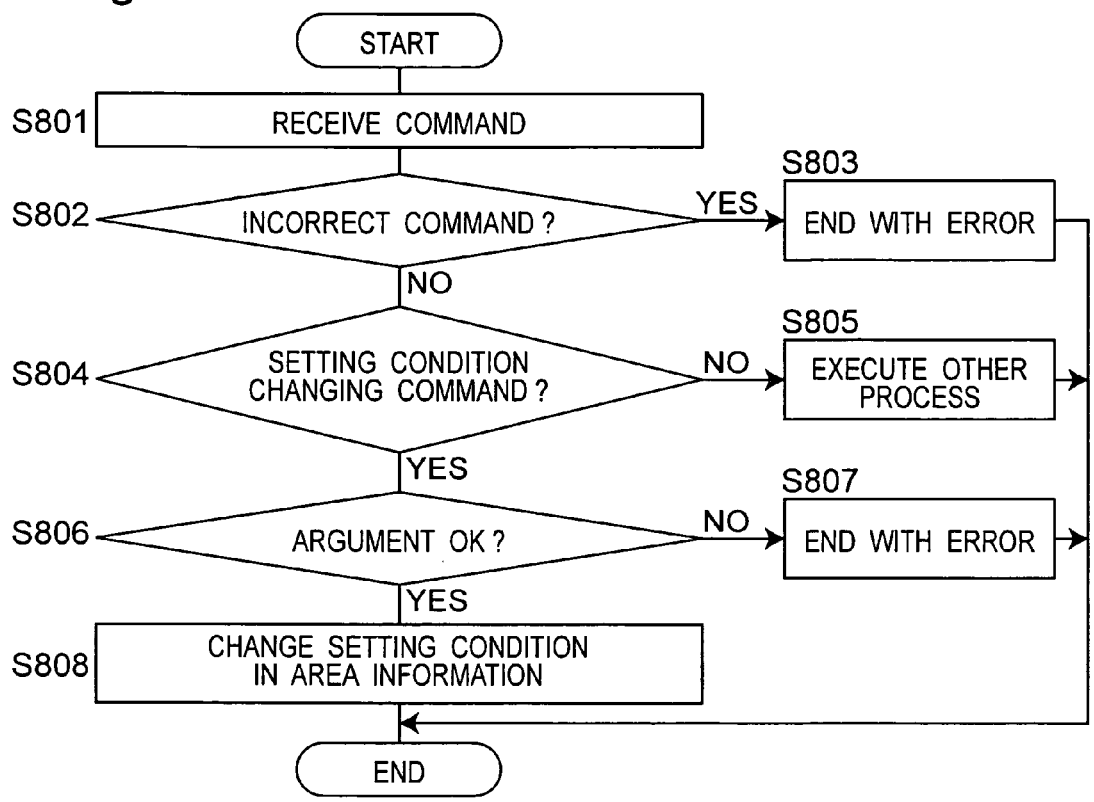
FIG. 9 is a flowchart of a setting condition changing process in embodiment 2.

The setting condition used in the area size setting process and existing in the area information storage section 119 can be changed also according to the request from the accessing device 100. FIG. 9 is a flowchart showing the setting condition changing process of the embodiment. The setting condition changing process is executed with the setting condition changing command from the accessing device 100. The setting condition changing command has the following format.

Set_Change_Condition (Rate, Area)

The argument "Rate" specifies a rate (RT1) of the authentication area 1 or a rate (RT2) of the authentication area 2. The argument "Area" specifies type of the area (first area or second area).

In the setting condition changing process in FIG. 9, after receiving the command, as mentioned above, checking of incorrect command, checking of argument, error processing, etc. are executed (S801 to S807). When the received command is judged to be an incorrect setting condition changing command, setting conditions RT1, RT2 in the area information storage section 119 are changed on the basis of the value of "Rate" specified by the command argument (S808). This procedure allows the accessing device 100 to set the values of setting conditions RT1 and RT2.

The nonvolatile memory 115 including the area information storage section 119 may not be provided independently of the semiconductor memory 117, but may be included in the semiconductor memory 117. At step S615 in FIG. 7, all data are erased, but only a part of data which is necessary to be erased may be erased, or no data may be erased if not necessary to erase. In the process in FIG. 7, if a remainder is produced, the fraction is rounded up, but it may be discarded, handled otherwise, as far as the value can be determined. In the process in FIG. 7, authentication process may be also added.

The command formats explained in the embodiment are only examples, and are not limited. For example, the argument "Size" may specify not the size of non-authentication area 1 but the size of non-authentication area 2, and may calculate the area size sequentially in the order of authentication area 2, authentication area 1, and non-authentication area 1. In other method, only the information for specifying the size of one area is enough For example, the ratio to the entire area of the memory card may be used. For example, when Size=80% is specified for the argument of the area size setting command and CS is 10000 MB, the size of non-authentication area 1 is calculated to be 8000 MB.

In the embodiment, the semiconductor memory 117 has two non-authentication areas and two authentication areas. However the invention can be applied if only one authentication area is present. In such a case, as the rate of authentication area in setting condition, either the rate to non-authentication area 1 or the rate to non-authentication area 2 may be used. If there are three or more authentication areas, the area size setting process may be applied to two authentication areas of them, and the size of other authentication areas may be fixed. Thus the embodiment may be freely changed and modified. As the setting conditions, RT1 and RT2 are used. However supposing RT1=RT2, only one information may be set and stored as the setting condition. Information other than the rate of authentication area may be used for the setting condition as far as the correlation of non-authentication area and authentication area can be identified.

Embodiment 3

FIG. 10 is a diagram of example of structure of the area information storage section 119 and the semiconductor memory 117 of the embodiment. The structure of semiconductor memory card and the accessing device in the embodiment is same as shown in FIG. 1. The information stored in the area information storage section 119 of the embodiment shown in FIG. 10 is same as in embodiment 2 shown in FIG. 6. What differs from embodiment 2 is that an unused area 125 is present in the semiconductor memory 117. In embodiment 2, all areas of the semiconductor memory 117 are fully assigned to four areas. In this embodiment, the semiconductor memory 117 has an unused area not belonging to any one of the four areas, and area size setting process in such case is explained.

In this embodiment, same as in embodiment 2, as the setting condition, the authentication area size is changed depending on change in the non-authentication area size with correlation provided between the non-authentication area size and the authentication area size. In the area size setting process of the embodiment, the size (AS1_D) of the non-authentication area 1 and the size (AS2_D) of the non-authentication area 2 are acquired from the accessing device 100, and the size (AS1_P) of the authentication area 1 and the size (AS2_P) of the authentication area 2 are determined on the basis of these acquired values and the setting condition stored in the area information storage section 119. Thus, the accessing device 100 specifies the sizes of two areas, and hence the sizes of four areas can be set.

Referring to FIG. 11, the area size setting process in the embodiment is explained. The area size setting process in the embodiment is executed by the area size setting function in the semiconductor memory card 110 as in embodiment 1.

In the area size setting process, first, the semiconductor memory card 110 receives a command from the accessing device 100 (S1001). Referring to the received command, it is judged whether the received command is an incorrect command which is not recognizable or not (S1002). If incorrect command, the error is notified to the accessing device 100, and the process is terminated (S1003). If not incorrect command such as a command which can be recognized, it is judged whether the command is a area size setting command or not (S1004). The area size setting command of the embodiment has the following format.

Set_Area_Size (Size1, Size2)

The size of the non-authentication area 1 is specified by argument "Size1", and the size of the non-authentication area 2 is specified by argument "Size2".

If other than area size setting command, other process corresponding to the command is executed (S1005). In the case of area size setting command, it is judged whether the argument transferred together with the command is correct or not (S1006). If a negative number is specified by the argument Size 1, or the argument is judged to be unjust, the error is notified to the accessing device 100 and the process is terminated (S1007). When the argument is correct, the size of non-authentication area 1 (AS1_D) is temporarily determined as the value of Size1 specified by the command (S1008).

Using the rate (RT1) of the authentication area 1 to the non-authentication area 1 stored in the area information storage section 119, the size (AS1_P) of the authentication area 1 is calculated (S1009). For example, when the size (AS1_D) of the non-authentication area 1 is 3000 MB and the rate (RT1) of authentication area 1 is 1%, the size (AS1_P) of authentication area 1 is calculated to be 30 MB.

The size (AS2_D) of the non-authentication area 2 is temporarily determined to the value of "Size2" specified by the command (S1010).

Using the rate (RT2) of authentication area 2 to non-authentication area 2 stored in the area information storage section 119, the size (AS2_P) of the authentication area 2 is calculated (S1011). For example, when the size (AS2_D) of the non-authentication area 2 is 6000 MB and the rate (RT2) of the authentication area 2 is 5%, the size (AS2_P) of authentication area 2 is calculated to be 300 MB.

Size values of four areas calculated so far in this procedure are judged to be valid or not (S1012). The values are valid when the total sizes of four areas does not exceed the card entire capacity (CS) and the value of each area is 0 or more. If the values are invalid, the error is notified to the accessing device 100, and the process is terminated (S1013). If the values are valid, data of all areas are erased (S1014), and finally the value in the area information storage section 119 is changed (S1015).

FIG. 12 shows an example of states of area information storage section 119 before and after the area size setting process explained in FIG. 11. FIG. 12(a) is a diagram before the area size setting process, and FIG. 12(b) is a state after the area size setting process by Set_Area_Size (Size1=3000 MB, Size2=6000 MB) from the state shown in FIG. 12(a). Method of calculation of values of AS1_D, AS2_D, AS1_P, and AS2_P is as explained in FIG. 11.

In the embodiment, in the semiconductor memory card 110 having plural recording areas, information about ratio of area size between specified recording areas is preliminarily stored in the area information storage section 119 as area setting condition. According to the area setting request from the accessing device 100, the size of each recording area can be set automatically using the area size specified by the accessing device 100 and the area setting condition.

The setting condition used in the area size setting process of the embodiment and stored in the area information storage section 119 can be changed also according to request from the accessing device 100 same as in embodiment 2. The setting condition changing process is same as explained in FIG. 9.

In this embodiment, since it is supposed that an unused area is present in the semiconductor memory 117, and it is more effective to provide the semiconductor memory card 110 having a function of acquiring the size of unused area or card entire capacity from the accessing device 100.

Incidentally, the nonvolatile memory 115 including the area information storage section 119 may not be provided independently of the semiconductor memory 117, but may be included in the semiconductor memory 117. At step S1014 in FIG. 11, all data are erased, but only a part of data which is necessary to be erased may be erased, or no data may be erased if not necessary to erase. In the process in FIG. 11, authentication process may be also added. The command formats explained in the embodiment are only examples, and are not specified. For example, the argument "Size1" may specify not the size of non-authentication area 1, but the size of authentication area 1, and thus handling of non-authentication area and authentication area may be inverted. Other method may be allowed as far as the information specifying the size of area can be specified, and for example, the ratio to the entire area of the card may be used. For example, when Size1=80% is specified by the argument of area size setting command and CS is 10000 MB, the size of the non-authentication area 1 is calculated to be 8000 MB.

In the embodiment, the semiconductor memory 117 has two non-authentication areas and two authentication areas, but the invention can be applied if only one authentication area is present. In such a case, as the rate of authentication area in the setting condition, either one of the rate to the non-authentication area 1 and the rate to the non-authentication area 2 may be used. If there are three or more authentication areas, the area size setting process may be applied to two authentication areas of them, and the size of the other authentication areas may be fixed. Hence the embodiment may be freely changed and modified. As the setting conditions, RT1 and RT2 are used, but only one information may be set and stored as the setting condition, supposing RT1=RT2.

Information other than the rate of authentication area may be used for the setting condition, as far as the correlation of non-authentication area and authentication area can be identified. Instead of two sets of non-authentication areas and authentication areas, the invention may be also applied to the semiconductor memory card having N sets. In this case, N sets of non-authentication area sizes may be specified in the arguments of area size setting command.

Embodiment 4

Figure 13:
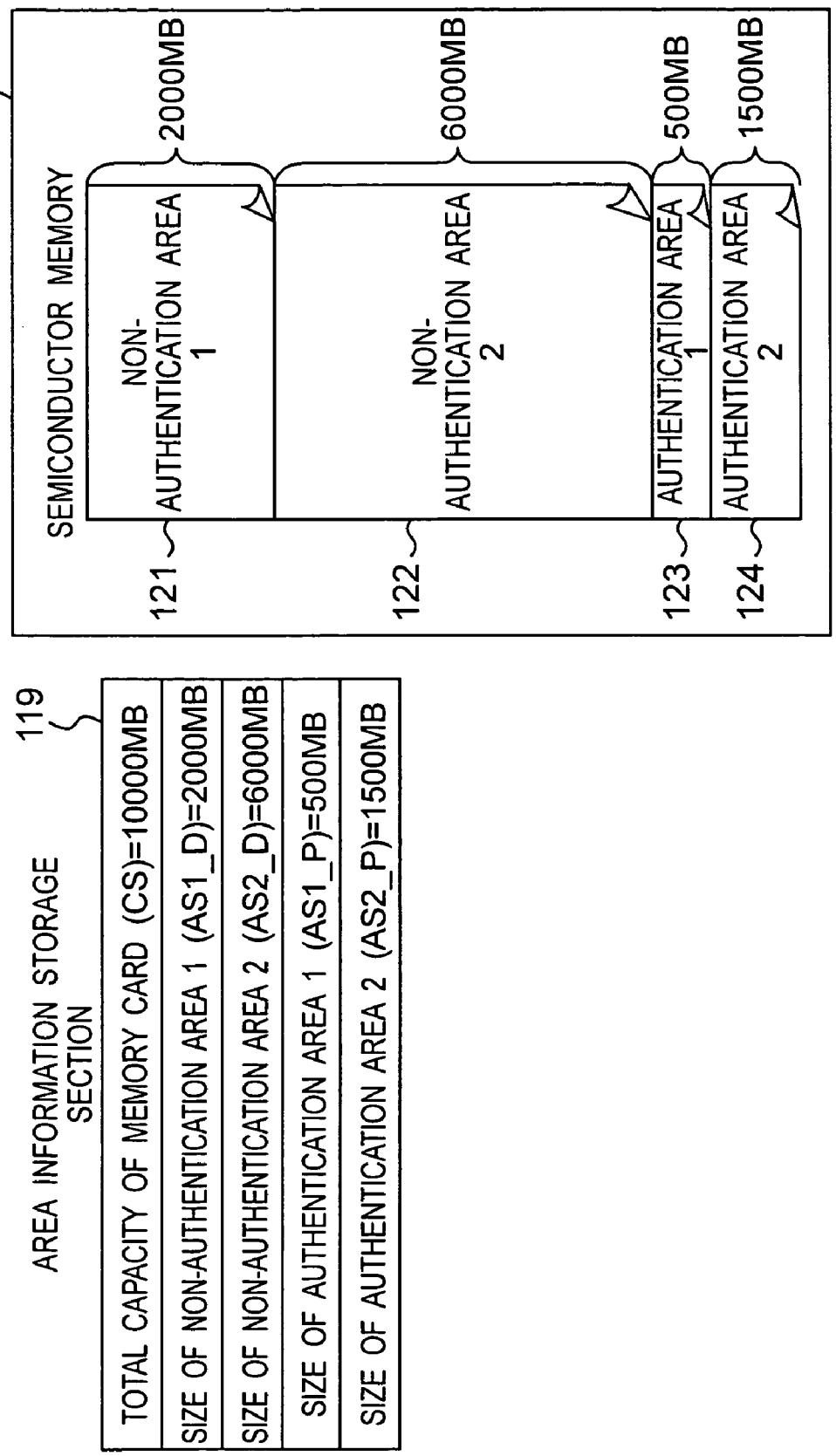
FIG. 13 is a diagram of an example of internal structure of the area information storage section and semiconductor memory in embodiment 4.

FIG. 13 is a diagram of example of internal structure of the area information storage section 119 and the semiconductor memory 117 of embodiment 4. The structure of the semiconductor memory card and the accessing device in the embodiment is same as shown in FIG. 1. The area information storage section 119 of the embodiment shown in FIG. 13 stores the size (CS) of entire area, the size (AS1_D) of the non-authentication area 1, the size (AS2_D) of the non-authentication area 2, the size (AS1_P) of the authentication area 1 and the size (AS2_P) of the authentication area 2 in the semiconductor memory 117.

In this embodiment, as in embodiment 3, with correlation provided between the non-authentication area size and the authentication area size, the authentication area size is changed depending on change in the non-authentication area size. In the area size setting process of the embodiment, the size of the non-authentication area 1 (AS1_D) and the size of the non-authentication area 2 (AS2_D) are acquired from the accessing device 100, and the size of the authentication area 1 (AS1_P) and the size of the authentication area 2 (AS2_P) are determined on the basis of these acquired values. As a result, the accessing device 100 can set the sizes of four areas by specifying the size of two areas. What this embodiment differs from embodiment 3 is that information stored in the area information storage section 119 is not used as the setting condition in the area size setting process. In this embodiment, when determining the size of each area in the authentication area, a composition ratio as a ratio of size of each area to the non-authentication area is calculated as the area setting condition. The size of each area in the authentication area is determined on the basis of the calculated composition ratio.

Figure 14:
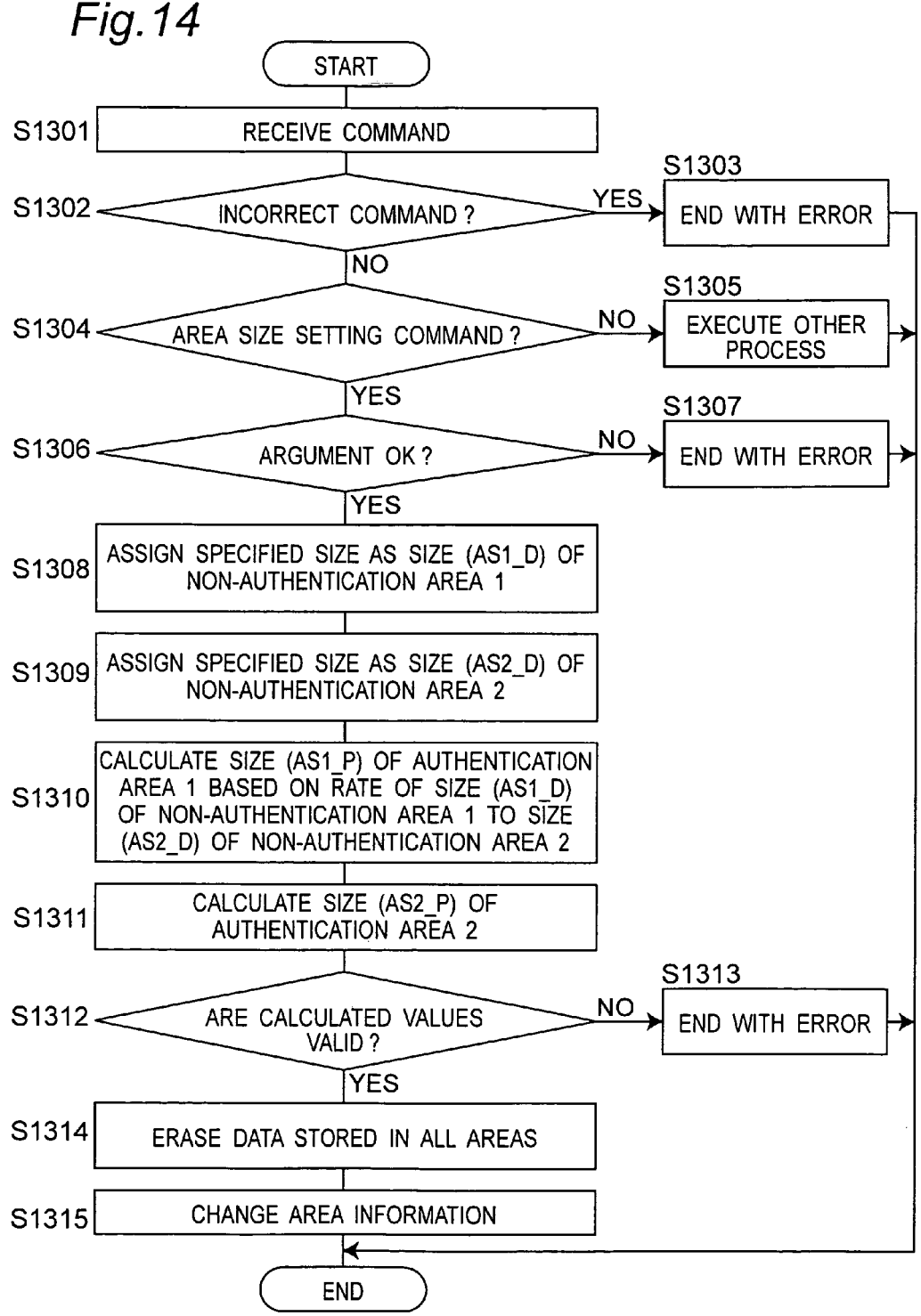
FIG. 14 is a flowchart of the area size setting process in embodiment 4.

Referring to FIG. 14, the area size setting process in the embodiment is explained. The area size setting process in the embodiment is executed by the area size setting function in the semiconductor memory card 110.

In the area size setting process in FIG. 14, first, the semiconductor memory card 110 receives a command from the accessing device 100 (S1301). Referring to the received command, it is judged whether the received command is an incorrect command which is not recognizable (S1302). If an incorrect command, the error is notified to the accessing device 100, and the process is terminated (S1303). If not an incorrect command, such as a command which can be recognized, it is judged whether the command is an area size setting command or not (S1304). The area size setting command of the embodiment has the following format.

Set_Area_Size (Size1, Size2)

The size of the non-authentication area 1 is specified by argument "Size1", and the size of the non-authentication area 2 is specified by argument "Size2".

If the received command is other than the area size setting command, other process corresponding to the command is executed (S1305). If the received command is the area size setting command, it is judged whether the argument transferred together with the command is correct or not (S1306). If the argument is judged to be incorrect, as when negative number is specified by the argument "Size1", the error is notified to the accessing device 100 and the process is terminated (S1307). When the argument is correct, the size (AS1_D) of the non-authentication area 1 is temporarily determined to the value of "Size1" specified by the command (S1308).

Next, the size (AS2_D) of the non-authentication area 2 is temporarily determined to the value of "Size2" specified by the command (S1309).

The composition ratio is determined as the ratio of size (AS1_D) of non-authentication area 1 to size (AS2_D) of non-authentication area 2. On the basis of this composition ratio, the size (AS1_P) of the authentication area 1 is calculated (S1310). For example, when the card entire capacity (CS) is 10000 MB, the size (AS1_D) of the non-authentication area 1 is 3000 MB, and the size (AS2_D) of the authentication area 2 is 5000 MB, the remaining area size that can be assigned for the authentication area is 2000 MB (=10000 MB−(3000+5000) MB). Since the ratio (composition ratio) of size (AS1_D) of the non-authentication area 1 to size (AS2_D) of non-authentication area 2 is 3:5, the remaining area size (2000 MB) is divided by the ratio of 3:5, and the size of authentication area 1 (AS1_P) is calculated to be 750 MB.

Further, the size of authentication area 2 (AS2_P) is calculated (S1311). The size of authentication area 2 can be calculated by subtracting the size of authentication area 1 from the remaining area size that can be assigned for authentication area. In this case, the size of authentication area 2 (AS2_P) is 1250 MB (=2000−750 MB).

Size values of four areas calculated so far in this procedure are judged to be valid or not (S1312). The values are valid when the total sizes of four areas does not exceed the card entire capacity (CS) and the value of each area is 0 or more. If the values are invalid, the error is notified to the accessing device 100, and the process is terminated (S1313). If valid, data of all areas are erased (S1314), and finally the value in the area information storage section 119 is changed (S1315).

Figure 15:
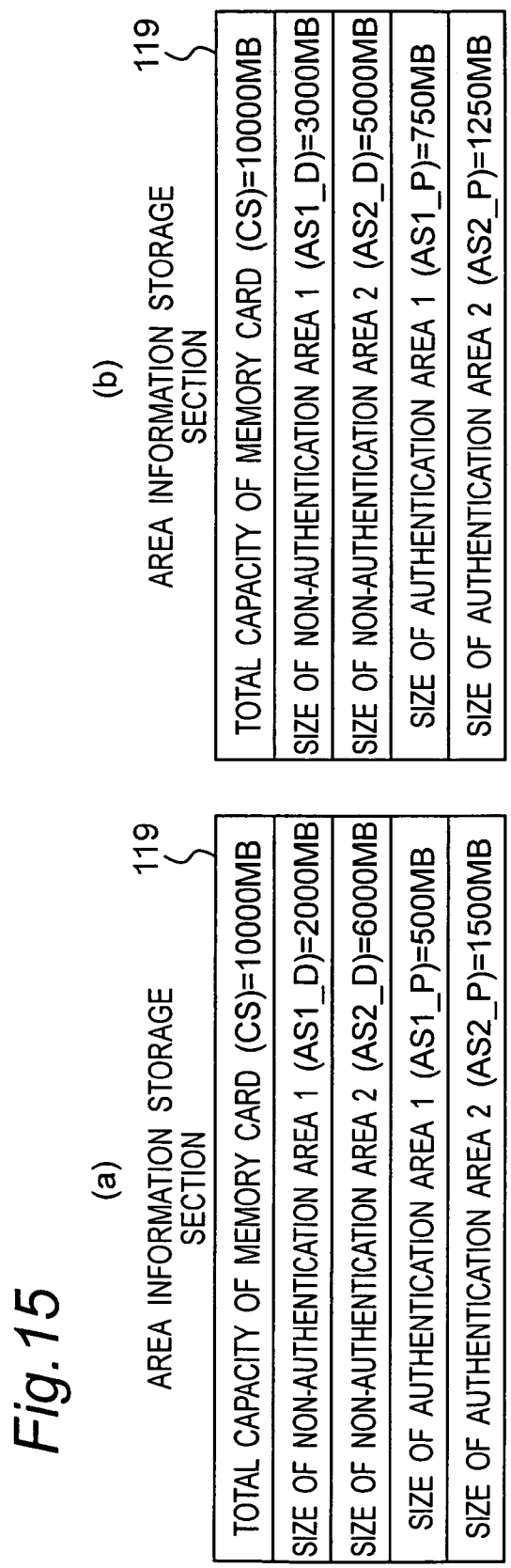
FIG. 15(a) is a diagram showing the state of the area information storage section before the area size setting process in embodiment 4.
FIG. 15(b) is a diagram showing the state of the area information storage section after the area size setting process in embodiment 4.

FIG. 15 shows an example of states of the area information storage section 119 before and after the area size setting process explained in FIG. 14. FIG. 15(a) is a diagram before the area size setting process, and FIG. 15(b) is a state after the area size setting process by Set_Area_Size (Size1=3000 MB, Size2=5000 MB) from the state shown in FIG. 15(a). Method of calculation of values of AS1_D, AS2_D, AS1_P, and AS2_P is as explained in FIG. 14.

In the embodiment, in the semiconductor memory card 110 having plural recording areas, the ratio of area sizes is calculated as the area setting condition from the area sizes between predetermined recording areas specified by the accessing device 100 according to the area setting request from the accessing device 100, the size of each recording area can be set automatically using the calculated area setting condition.

Incidentally, the nonvolatile memory 115 including the area information storage section 119 may not be provided independently of the semiconductor memory 117, but may be included in the semiconductor memory 117. At step S1314 in FIG. 14, all data are erased, but only a part of data which is necessary to be erased may be erased, or no data may be erased if not necessary to erase.

In the process in FIG. 14, calculation is not accompanied by a remainder, but if a remainder occurs, it may be rounded up, rounded off, handled otherwise. Further, authentication process may be also added to the process in FIG. 14.

The command formats explained in the embodiment are only examples, and the other formats can be used. For example, the argument "Size1" may specify not the size of the non-authentication area 1, but the size of authentication area 1, and thus handling of non-authentication area and authentication area may be inverted. Otherwise other method may be allowed as far as the information specifying the size of area can be specified. For example, the ratio to the entire area of the memory card may be used. Specifically, when Size1=80% is specified by the argument of the area size setting command and CS is 10000 MB, the size of the non-authentication area 1 is calculated to be 8000 MB.

In the embodiment, the semiconductor memory 117 has two non-authentication areas and two authentication areas, but the invention can be applied if only one authentication area is present. In such a case, the size of authentication area is the value of subtracting the sum of sizes of non-authentication areas from the card entire capacity (CS). If there are three or more authentication areas, the area size setting process may be applied to two authentication areas of them, and the size of the other authentication areas may be fixed. Thus the embodiment may be freely changed and modified.

Instead of two sets of non-authentication area and authentication area, the invention may be also applied to the semiconductor memory card 110 having N sets (N being a natural number). In this case, N sets of non-authentication area sizes may be specified in the arguments of area size setting command.

In the embodiment, by specifying the sizes of non-authentication area 1 and non-authentication area 2, the sizes of authentication area 1 and authentication area 2 are automatically set on the basis of composition ratio of non-authentication area 1 to non-authentication area 2. However by specifying the sizes of non-authentication area 1 and authentication area 1, the sizes of non-authentication area 2 and authentication area 2 may be set automatically on the basis of the composition ratio of non-authentication area 1 to authentication area 1.

Embodiment 5

In this embodiment, the area information storage section 119 manages the state of area sizes of the areas 121 to 124 in the semiconductor memory 117 as the setting condition. The state includes the combination of area sizes of the areas 121 to 124 in the semiconductor memory 117. The area information storage section 119 stores information about plural states. The accessing device 100 sends a command for selecting one state to the semiconductor memory card 110, and the semiconductor memory card 110 validates one selected state according to the command. In this configuration, the accessing device 100 can set the sizes of four areas by selecting only one of plural preset states.

Figure 16:
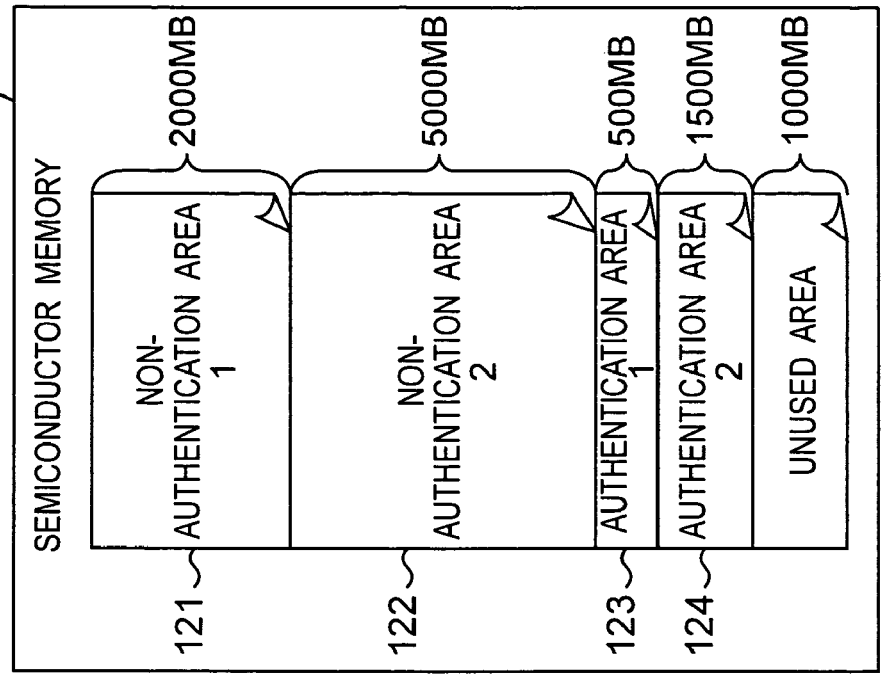
FIG. 16 is a diagram of example of internal structure of the area information storage section and semiconductor memory in embodiment 5.

FIG. 16 is a diagram of example of structure of the area information storage section 119 and the semiconductor memory 117 of the embodiment. The structure of the semiconductor memory card and the accessing device in the embodiment is same as shown in FIG. 1. The area information storage section 119 as shown in FIG. 16 stores the detailed information about size (CS) of entire area existing in the semiconductor memory 117, the total number of states existing in the area information, validity flag (AF) showing presently valid state, and states (cases 1, 2). As the first state (case 1), the size (AS1_D) of the non-authentication area 1, the size (AS2_D) of the non-authentication area 2, the size (AS1_P) of the authentication area 1, and the size (AS2_P) of the authentication area 2 are stored. As the second state (case 2), further, other combination of four area sizes are stored.

Figure 17:
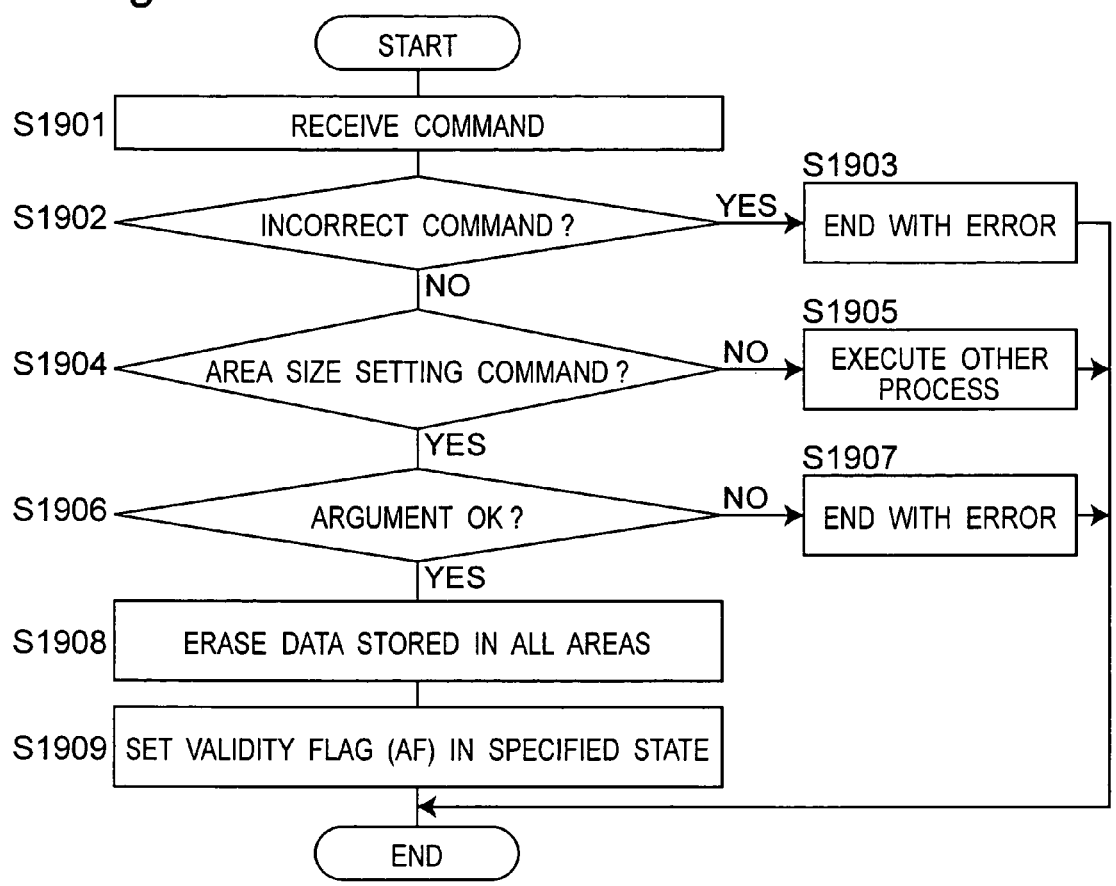
FIG. 17 is a flowchart of the area size setting process in embodiment 5.

Referring to FIG. 17, the area size setting process in the embodiment is explained. The area size setting process in the embodiment is executed by the area size setting function in the semiconductor memory card 110.

In the area size setting process in FIG. 17, first, the semiconductor memory card 110 receives a command from the accessing device 100 (S1901). Referring to the received command, it is judged whether the received command is incorrect command which is not recognizable (S1902). If the received command is an incorrect command, the error is notified to the accessing device 100, and the process is terminated (S1903). If the received command which can be recognized is not an incorrect command, it is judged whether the command is an area size setting command (S1904). The area size setting command has the following format.

Set_Area_Size (Flag)

The argument Flag specifies one of plural states stored preliminarily in the area information storage section 119.

If the received command is other than area size setting command, other process corresponding to the command is executed (S1905). If the received command is the area size setting command, it is judged whether the argument transferred together with the command is correct or not (S1906).

If the argument is judged to be incorrect, like that non-existing state is specified by the argument Flag, the error is notified to the accessing device 100 and the process is terminated (S1907). If the argument is correct, the data in all areas are erased (S1908).

Finally, the validity flag (AF) in the area information storage section 119 is changed to the value specified by the argument Flag (S1909). In the case of FIG. 16, since the semiconductor memory card 110 stores two states of case 1 and case 2 as the states in the area information storage section 119, the accessing device 100 specifies either one of case 1 and case 2 as the state, and the value of the validity flag (AF) in the area information storage section 119 is changed to the specified state.

As explained herein, in the embodiment, as the area setting condition, the state (combination) of area size of each area in the semiconductor memory 117 is managed, and the size of each area can be set simultaneously according to the state specified by the accessing device 100.

In the area size setting process of the embodiment, since plural states are set preliminarily in the area information storage section 119, preferably, the semiconductor memory card 110 may have the function of acquiring the information about the preset states, the number of states, or the presently valid state, from the accessing device 100. Further, the semiconductor memory card 110 may have functions of adding, changing or deleting the states from the accessing device 100.

Incidentally, the nonvolatile memory 115 including the area information storage section 119 may not be provided independently of the semiconductor memory 117, but may be included in the semiconductor memory 117. At step S1908 in FIG. 17, all data are erased. But only a part of data which is necessary to be erased may be erased, or no data may be erased if not necessary to erase. In the process in FIG. 17, authentication process may be also added.

The command formats explained in the embodiment are only examples, and other format can be used. In the embodiment, the semiconductor memory 117 has two non-authentication areas and two authentication areas. But the number of non-authentication areas and authentication areas may be zero or more, because the area size setting process of the embodiment is intended to set the state in which the area size of each area is specified. Two states are specified herein, but the number of states may be one or more.

Embodiment 6

In embodiment 1, the method of setting non-authentication area and authentication area individually is explained. In that case, the area size can be set in each area of the non-authentication area or the authentication area, but the area size cannot be changed over the non-authentication area and authentication area at the same time. This embodiment relates to a process of changing the area size over non-authentication area and authentication area at the same time (hereinafter called "area size setting process in different areas").

The area size setting process in different areas of the embodiment is executed by the area size setting command in different areas. The area size setting command in different areas has the following format.

Set_Area_Border (Size)

The argument "Size" specifies the total non-authentication area size.

Figure 18:
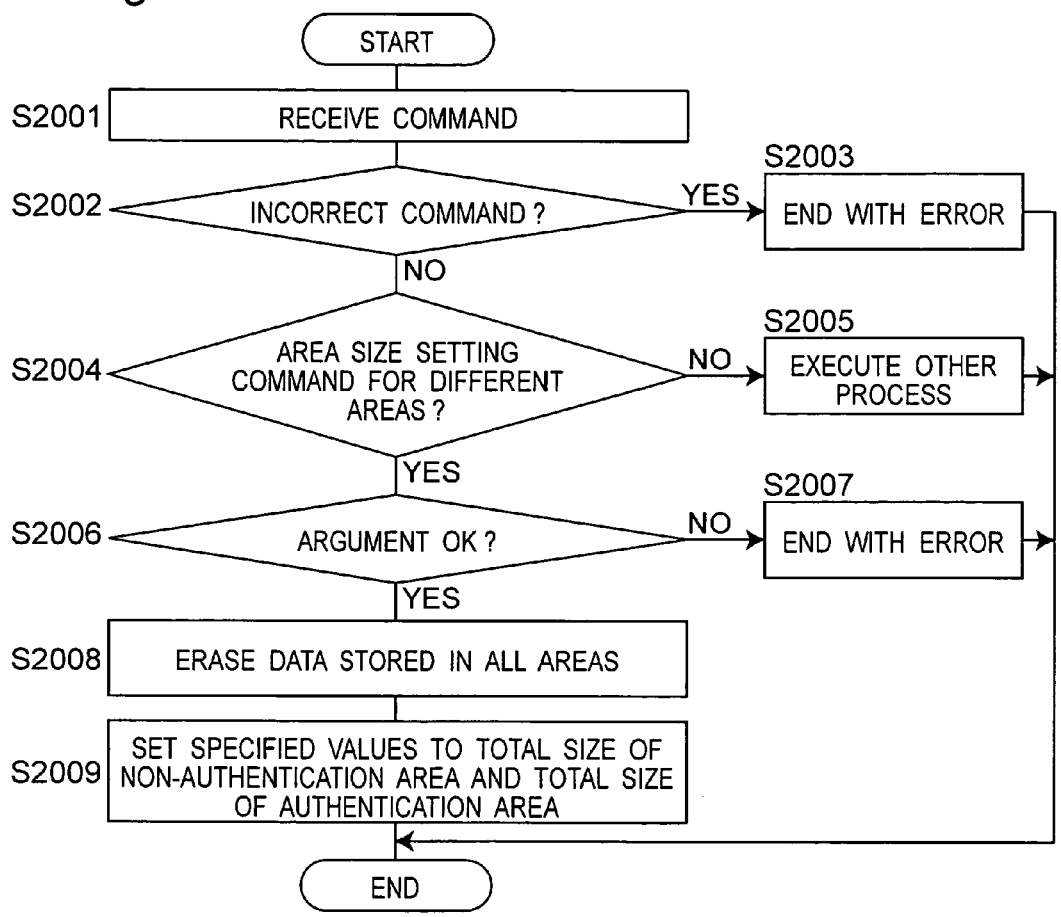
FIG. 18 is a flowchart of the area size setting process in different areas in embodiment 6.

Referring to FIG. 18, the area size setting process in different areas of the embodiment is explained. The area size setting process in different areas is executed by the area size setting function in the semiconductor memory card 110.

In the area size setting process shown in FIG. 18, first, the semiconductor memory card 110 receives a command from the accessing device 100 (S2001). Referring to the received command, it is judged whether it is incorrect command which is not recognizable (S2002). If the received command is an incorrect command, the error is notified to the accessing device 100, and the process is terminated (S2003). If the received command which can be recognized is not an incorrect command, it is judged whether the command is an area size setting command in different areas (Set_Area_Border) (S2004).

If the received command is other than the area size setting command in different areas, other process corresponding to the command is executed (S2005). If the received command is the area size setting command in different areas, it is judged whether the argument transferred together with the command is correct or not (S2006). If the argument is incorrect, as that negative value is specified by argument "Size", the error is notified to the accessing device 100 and the process is terminated (S2007). When the argument is correct, the data in all areas are erased (S2008). Finally, the total non-authentication area size and total authentication area size in the area information storage section 119 are changed according to the values specified by the command (S2009). For example, when the entire capacity (CS) of the semiconductor memory 117 is 10000 MB and 7000 MB is specified as total non-authentication area size by argument "Size" of the area size setting command in different areas, the total non-authentication area size (TS_D) in the area information storage section 119 is set to 7000 MB. Since the total capacity (CS) of the semiconductor memory 117 is 10000 MB, the total authentication area (TS_P) is set to 3000 MB.

FIG. 19 shows an example of states of the area information storage section 119 before and after the area size setting process in different areas explained in FIG. 18. The area information storage section 119 stores the memory card entire capacity (CS) as the setting condition. FIG. 19(a) shows the state before the setting process, and FIG. 19(b) is a state after the area size setting process by Set_Area_Border (Size=7000 MB) from the state shown in FIG. 19(a).

In the embodiment, when the semiconductor memory 117 has two areas of non-authentication area and authentication area and each area is divided into and managed in two or more areas in the semiconductor memory card 110, the entire size of the non-authentication area and the authentication area can be set arbitrarily.

Incidentally, the nonvolatile memory 115 including the area information storage section 119 may not be provided independently of the semiconductor memory 117, but may be included in the semiconductor memory 117. At step S2008 in FIG. 18, all data are erased, but only a part of data which is necessary to be erased may be erased, or no data may be erased if not necessary to erase. In the process in FIG. 18, authentication process may be also added.

The command formats explained in the embodiment are only examples, and other format can be used. For example, "Size" may specify not the non-authentication area size, but the authentication area size. Otherwise both non-authentication area size and authentication area size may be specified by the argument. Instead of specifying the area size by argument, the ratio to the card entire area may be used. For example, when Size=80% is specified by the argument of the area size setting command in different areas and CS=10000 MB, the size of the non-authentication area is calculated to be 8000 MB.

In the embodiment, the semiconductor memory 117 has two non-authentication areas and two authentication areas, but the number of non-authentication areas and authentication areas in combination may be one or more.

This embodiment is intended to change all the non-authentication area sizes and authentication area sizes, but only one set of non-authentication area size or authentication area size may be changed. In this case, the argument for specifying the set for changing the area size may be set in the argument of the area size setting command in different areas.

Embodiment 7

In the foregoing embodiments, various methods for setting the size of each area in the semiconductor memory 117 are explained. These methods are silent about limitation of allowable area setting size. In actual design, however, if the design with setting in all area sizes can be allowed, although the degree of freedom of the setting becomes higher, the number of test items in the commercial product becomes a tremendous number.

In consideration of solution for such a problem, it is preferred to provide a limitation of an allowable area size before executing the area size setting process. The limitation is not particularly specified as far as it is agreed by the accessing device 100 and the semiconductor memory card 110. Some example limitations are explained below.

First, a limitation by setting the area size in a discrete value is described.

Figure 20:
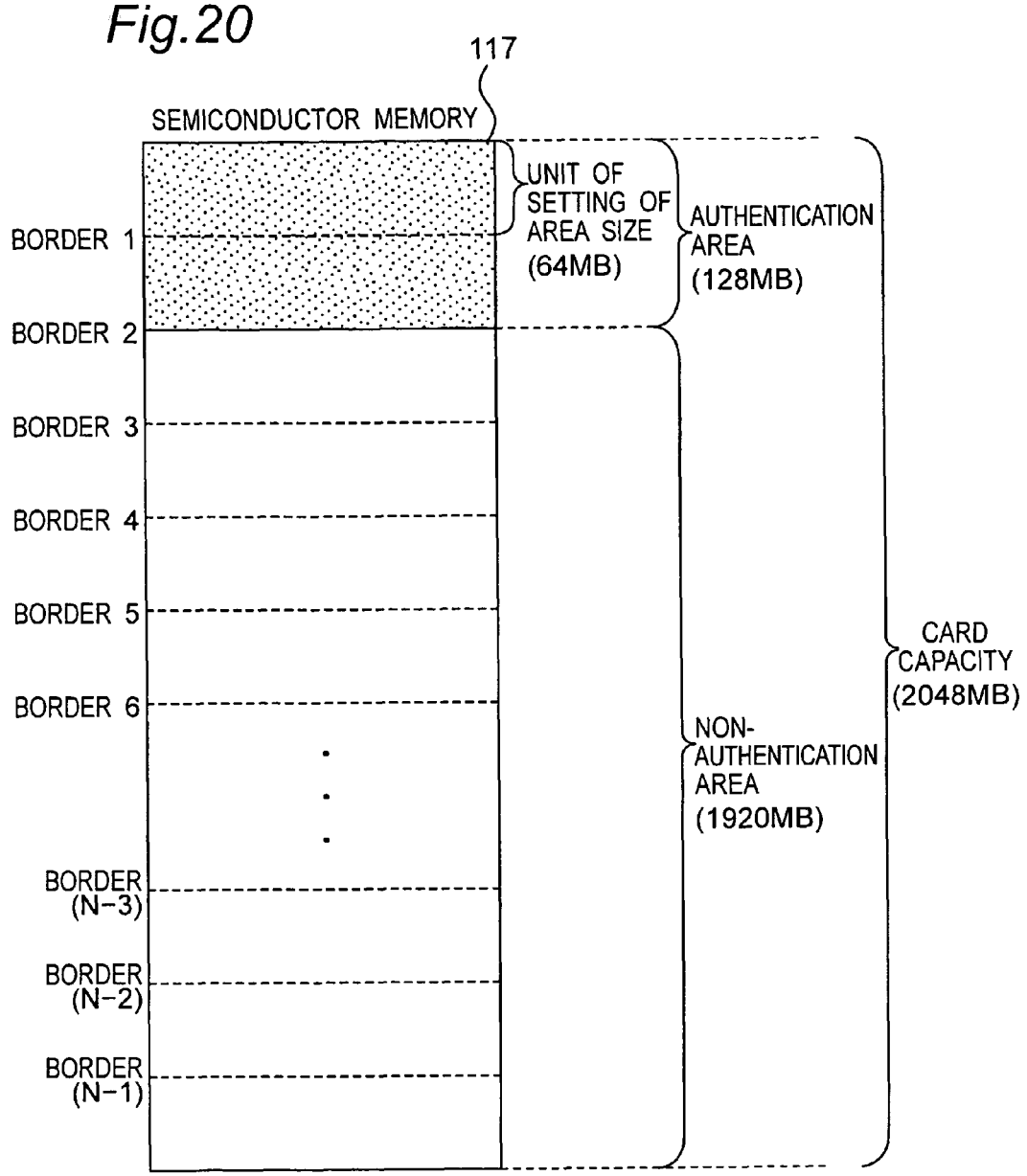
FIG. 20 is a diagram of an example of the area size setting method in embodiment 7.

FIG. 20 is a diagram of example of area size setting method. In FIG. 20, the allowable area size is set in an integer multiple of data unit (area size setting unit) of fixed size. That is, in this method, the total area in the semiconductor memory 117 is divided in area size setting unit (herein 64 MB) and managed in N (N being a natural number) divided areas. In the area size setting, the area border is allowed to be set in any border from border 1 to border (N−1) in a multiple of area size setting unit. That is, the size of each area is an integer multiple of area size setting unit. In the example in FIG. 20, the border of authentication area and non-authentication area is present at border 2, and the size of authentication area is set at 128 MB, and the size of non-authentication area is set at 1920 MB.

Figure 21:
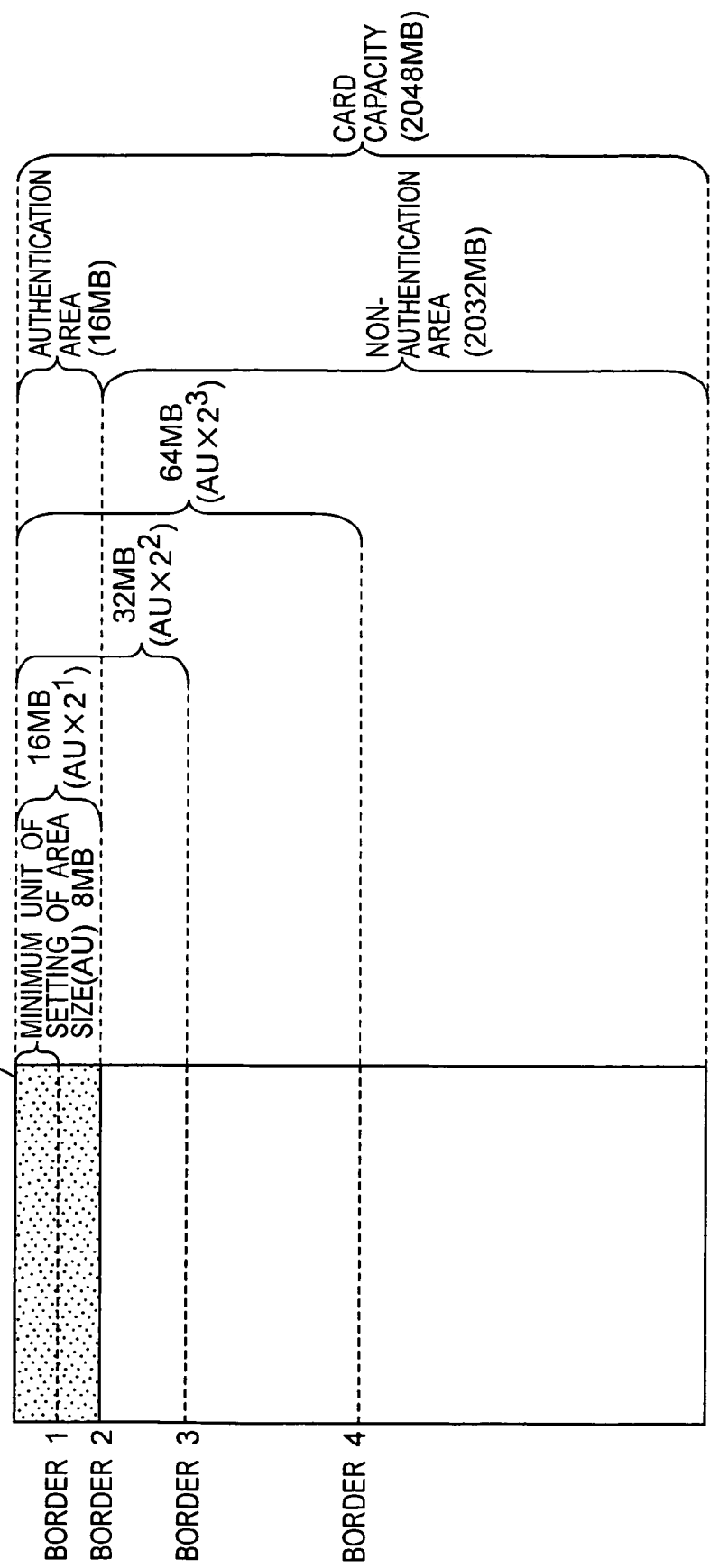
FIG. 21 is a diagram of other example of the area size setting method in embodiment 7.

FIG. 21 is a diagram of other example of area size setting method in the embodiment. In FIG. 21, the possible area setting size is shown to be set in a size of power of 2 of minimum setting unit (AU) of fixed size. In this method, the area border is present at the position of power of 2 of minimum setting unit (AU) (herein 8 MB), and the area size is allowed to be set only on this border. In FIG. 21, border 1 is present at position of 8 MB, border 2 is present at position of 16 MB, border 3 is present at position of 32 MB, and border 4 is present at position of 64 MB, and similarly each border is present at position of power of 2 of minimum setting unit (AU). In FIG. 21, meanwhile, the border of authentication area and non-authentication area is present on border 2, and the size of authentication area is set at 16 MB, and the size of non-authentication area is set at 2032 MB.

Secondly, a limitation in consideration of physical characteristics of the semiconductor memory is described.

The flash memory mainly used in the semiconductor memory 117 has a physical characteristic in which bad blocks are present with a specific probability. For example, in a flash memory having a physical memory of 1000 blocks with a rate of good block is 98%, a maximum of 20 bad blocks may be present (2% of 1000 blocks). Accordingly, in the semiconductor memory card using the flash memory, in consideration of presence of bad blocks, the area size (capacity) presented as recording area to outside of the semiconductor memory card is smaller than the total number of blocks physically existing inside.

Figure 22:
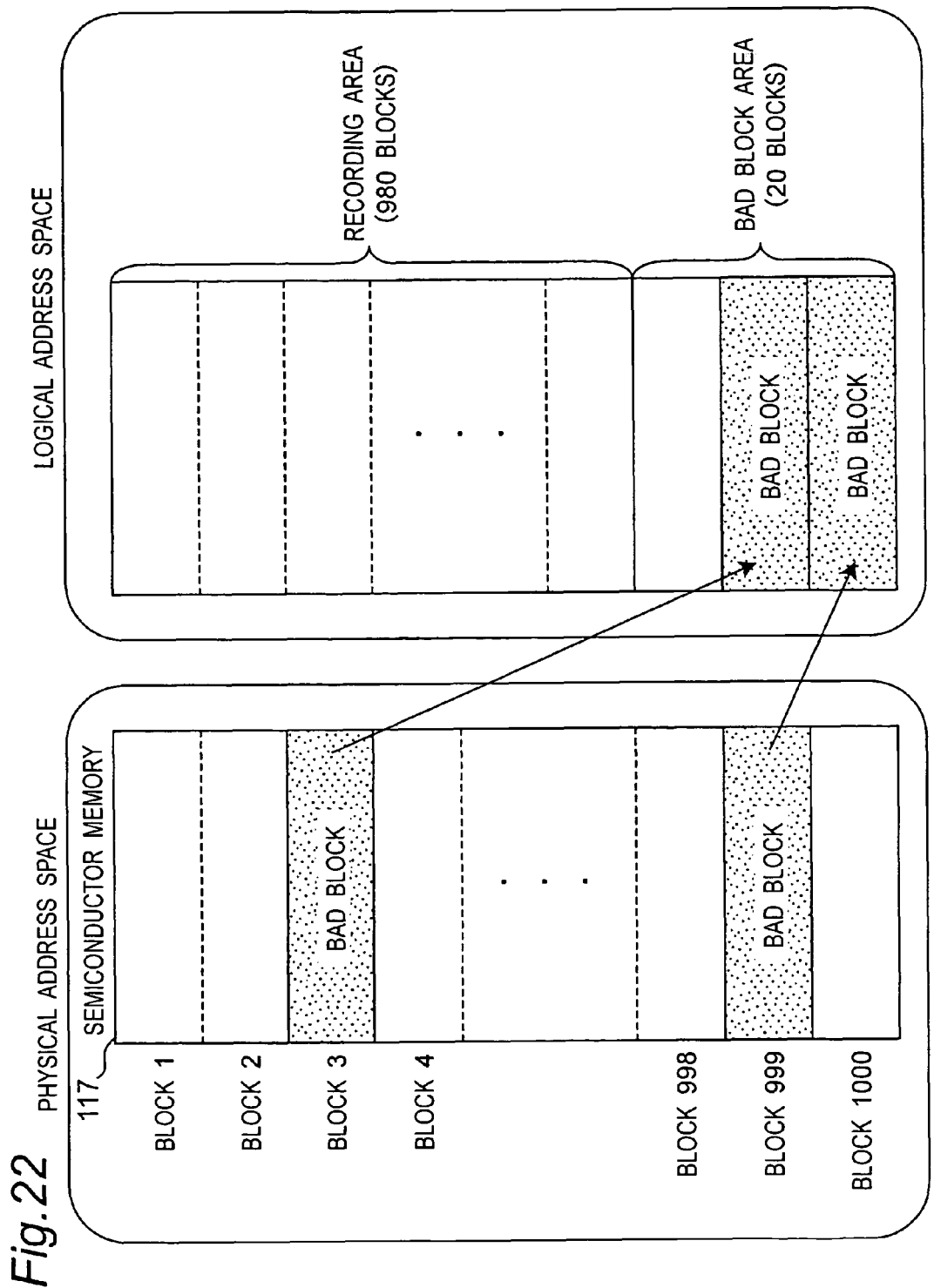
FIG. 22 is an explanatory diagram of relation of physical address space and logical address space of the semiconductor memory, and relation of bad blocks between the address spaces.

FIG. 22 shows an example of the recording area in the semiconductor memory card 110. The semiconductor memory card 110 manages a table relating the physical address on the flash memory to the logical address used for the external accessing device 100. Further, the semiconductor memory card 110 manages two areas, that is, the recording area that can be accessed from outside accessing device 100, and the bad block area of inaccessible bad blocks. According to the mechanism, if a bad block is detected in the flash memory, the address of the bad block is converted into logical address in the bad block area and managed, so that it may not be accessed from the accessing device 100.

That is, by collecting bad blocks logically in the bad block area, even if a bad block exists at any physical position, access to all good blocks is guaranteed. In an actual semiconductor memory card, as bad block countermeasure, not only the bad block is managed in the bad block area, but also the bad block is replaced by a normal block if the normal block is physically destroyed and disabled. Accordingly, a replacement block area containing a specific number of blocks is maintained. In this case, the number of blocks usable as recording area is further decreased. In the following explanation, bad blocks are mainly described.

When the area of such semiconductor memory card is divided into plural areas, it is unknown which area contains bad blocks. Accordingly, the area size setting is limited so that a certain good block rate may be satisfied in each area.

Figure 23:
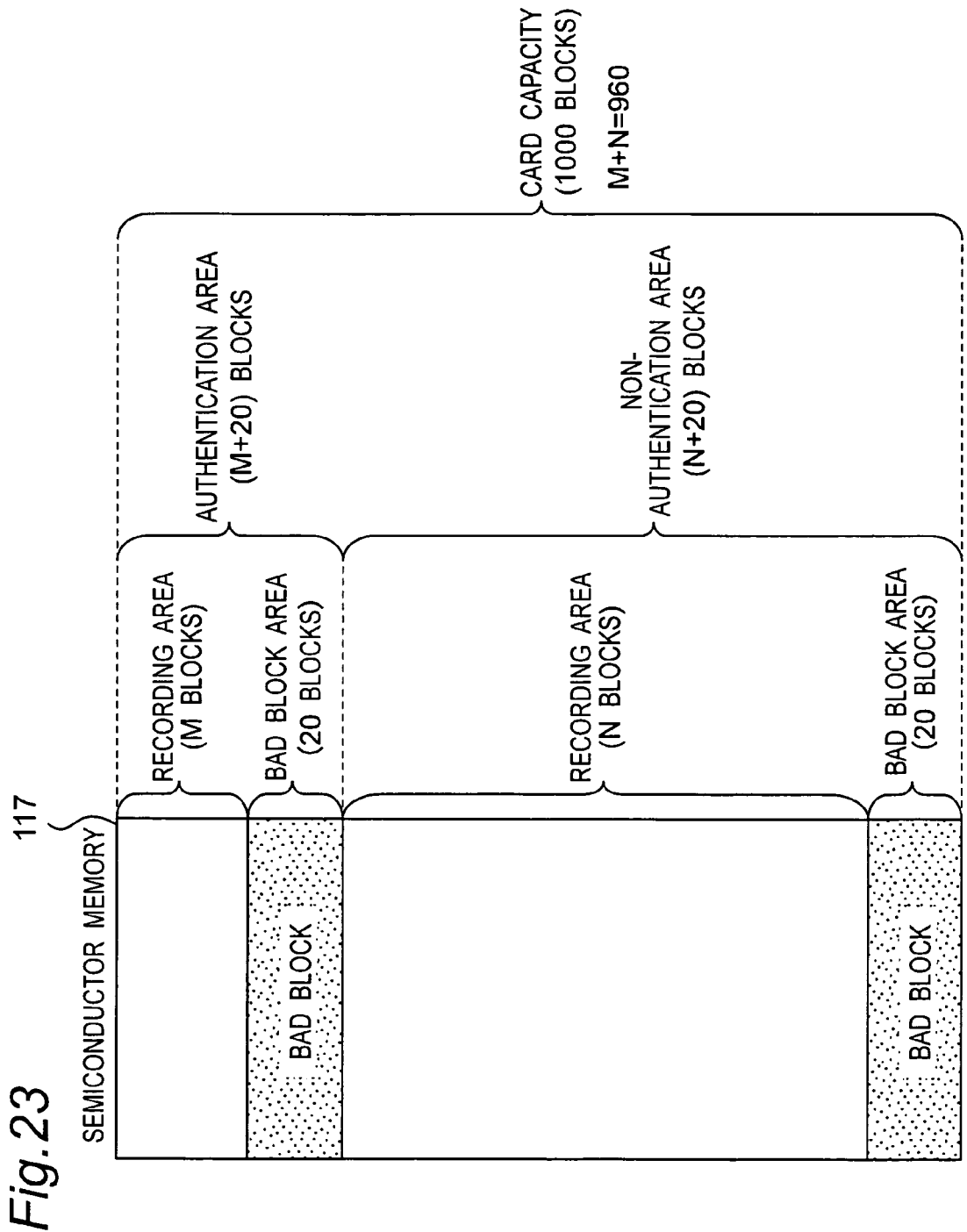
FIG. 23 is an explanatory diagram of the area size setting process in consideration of presence of bad blocks in embodiment 7.

FIG. 23 is an explanatory diagram of area size setting process in consideration of presence of bad blocks. In FIG. 23, the area size is expressed in block unit, and 1000 blocks are present in the semiconductor memory 117, and the good block rate is 98%. When this semiconductor memory 117 is managed by dividing into authentication area and non-authentication area, it is possible that bad blocks are included in both areas, and the bad block area for maximum number of bad blocks (20 blocks) must be set in each one of authentication area and non-authentication area. This is because, even if all bad blocks are concentrated and included in either one of authentication area or non-authentication area, a recording area of at least one block is required. Hence, the area size of authentication area and non-authentication area must be set larger than the maximum number of bad blocks (21 blocks or more). That is, as the limit of area size setting, it is needed to limit by the size of each area size >maximum number of bad blocks (20 blocks).

Figure 24:
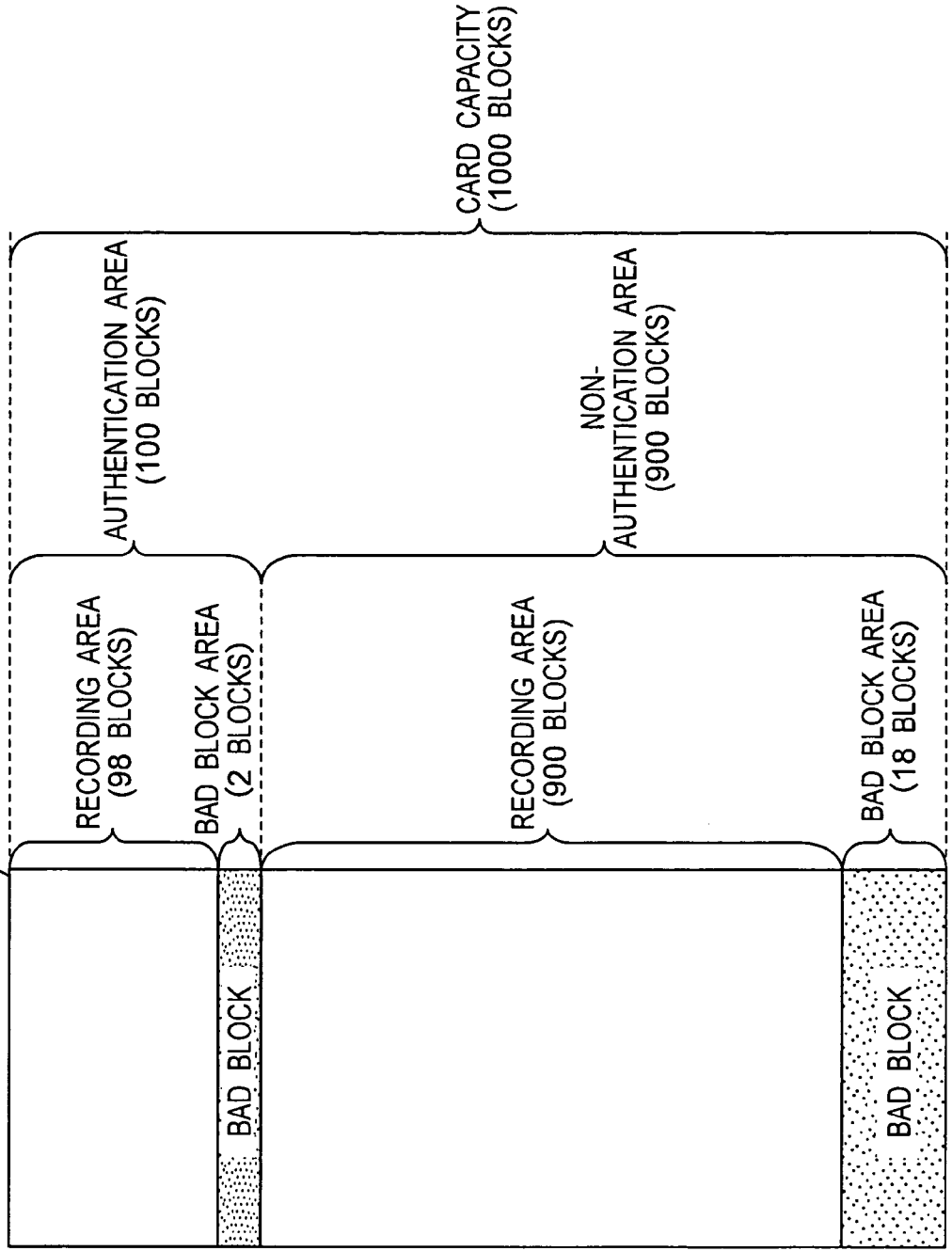
FIG. 24 is an explanatory diagram of other example of the area size setting process in consideration of presence of bad blocks in embodiment 7.

To reduce the limit, the flash memory may be improved. In a conventional flash memory, the good block rate per card is specified. Instead, the good block rate may be specified per a predetermined number of blocks. For example, as for a flash memory containing 1000 blocks, the good block rate per 100 blocks may be specified to be 98%. In this case, in the area size setting, it can be expected that two bad blocks exist per 1000 blocks. That is, when the authentication area size is set at 100 blocks as shown in FIG. 24, it is enough to reserve only two blocks for the bad block area. Thus the limit is reduced as compared with a case of 20 bad blocks shown in FIG. 23.

In this embodiment, it is supposed that one authentication area and one non-authentication area are present in the semiconductor memory 117, but the invention may be also applied to the case having two or more areas each. As the limitation with the area setting size in discrete value, two methods are explained herein. But other limitation may be employed. Although the allowable area setting size is limited depending on the good block rate, it may be also limited based on the erasing block size of the flash memory, area management unit in the semiconductor memory card, or other physical characteristics.

Although the present invention has been described in connection with specified embodiments thereof, many other modifications, corrections and applications are apparent to those skilled in the art. Therefore, the present invention is not limited by the disclosure provided herein but limited only to the scope of the appended claims.

INDUSTRIAL APPLICABILITY

The invention can be applied in information recording medium for storing data, and digital AV appliance, portable information terminal, personal computer and other accessing devices for accessing this information recording medium. In particular, the invention is useful when each recording area of information recording medium is managed by an independent file system because the size of each recording area can be set appropriately from outside in the information recording medium having plural recording areas.

The invention claimed is:

1. A non-transitory information recording medium storing data which can be accessed from an accessing device, comprising:
  a storage device configured to store data and having plural areas respectively managed by independent file systems;
  an area information storage configured to store information about size and position of each area of the storage device;
  a host interface configured to receive a command for setting a size of each area of the storage device from the accessing device;
  an area size setter configured to set size and position of each area of the storage device based on a predetermined setting condition according to the command received from the accessing device; and
  an authentication controller configured to authenticate the accessing device,
  wherein the storage device has an authentication area which allows access from the accessing device only when authentication by the authentication controller is successful, and a non-authentication area which allows access from the accessing device regardless of a result of the authentication by the authentication controller, wherein the non-authentication area and authentication area individually have plural areas, and each area in the non-authentication area has a corresponding area in the authentication area, wherein the predetermined setting condition comprises a ratio of a size of an area included in the non-authentication area to the size of the corresponding area included in the authentication area, wherein the host interface receives the size of one area in the non-authentication area or authentication area from the accessing device, and wherein the area size setter determines the size of each area in the non-authentication area and authentication area on the basis of the received size of one area and the ratio, and sets the information to be stored in the area information storage on the basis of the received size and determined size.

2. The non-transitory information recording medium according to claim 1, wherein the area size setter allows only a discrete value for the size received from the accessing device.

3. The non-transitory information recording medium according to claim 1, wherein the area size setter sets the size of each area of the storage device to be larger than a total size of inaccessible blocks, which is calculated by an entire size or each area size of the storage device and a rate of accessible blocks.

4. The non-transitory information recording medium according to claim 1, wherein the size of m areas included in the authentication area, and the size of n areas included in the non-authentication area (m and n are integers of 0 or more, m+n≧2) are fixed size.

5. A non-transitory information recording medium storing data which can be accessed from an accessing device, comprising:

a storage device configured to store data and having plural areas respectively managed by independent file systems;

an area information storage configured to store information about size and position of each area of the storage device;

a host interface configured to receive a command for setting a size of each area of the storage device from the accessing device;

an area size setter configured to set size and position of each area of the storage device based on a predetermined setting condition according to the command received from the accessing device; and an authentication controller configured to authenticate the accessing device, wherein the storage device has an authentication area which allows access from the accessing device only when authentication by the authentication controller is successful, and a non-authentication area which allows access from the accessing device regardless of a result of the authentication by the authentication controller, wherein the non-authentication area and authentication area individually have plural areas, and each area in the non-authentication area has a corresponding area in the authentication area, wherein the predetermined setting condition comprises a ratio of a size of an area included in the non-authentication area to a size of the corresponding area included in the authentication area, wherein the host interface receives the size of each area in the non-authentication area or the authentication area from the accessing device, and wherein the area size setter determines the size of each area in the non-authentication area and the authentication area on the basis of the received size of each area and the ratio, and sets the information to be stored in the area information storage on the basis of the received size and determined size.

6. A non-transitory information recording medium storing data which can be accessed from an accessing device, comprising:

a storage device configured to store data and having plural areas respectively managed by independent file systems;

an area information storage configured to store information about size and position of each area of the storage device;

a host interface configured to receive a command for setting a size of each area of the storage device from the accessing device;

an area size setter configured to set size and position of each area of the storage device based on a predetermined setting condition according to the command received from the accessing device; and an authentication controller configured to authenticate the accessing device, wherein the storage device has an authentication area which allows access from the accessing device only when authentication by the authentication controller is successful, and a non-authentication area which allows access from the accessing device regardless of a result of the authentication by the authentication controller, wherein the non-authentication area and authentication area individually have plural areas, and each area in the non-authentication area has a corresponding area in the authentication area, wherein the predetermined setting condition comprises a composition ratio of each area in the non-authentication area or the authentication area, wherein the host interface receives sizes of respective areas in one of the non-authentication area and the authentication area from the accessing device, and wherein the area size setter calculates the composition ratio from the received sizes of respective areas, determines sizes of respective areas in an other of the non-authentication area and the authentication area on the basis of the calculated composition ratio, and sets the information to be stored in the area information storage according to the received sizes and determined sizes.

7. A non-transitory information recording medium storing data which can be accessed from an accessing device, comprising:

a storage device configured to store data and having plural areas respectively managed by independent file systems;

an area information storage configured to store information about size and position of each area of the storage device;

a host interface configured to receive a command for setting a size of each area of the storage device from the accessing device;

an area size setter configured to set a size and a position of each area of the storage device based on a predetermined setting condition according to the command received from the accessing device; and an authentication controller configured to authenticate the accessing device, wherein the storage device has an authentication area which allows access from the accessing device only when authentication by the authentication controller is successful, and a non-authentication area which allows access from the accessing device regardless of a result of the authentication by the authentication controller, wherein the non-authentication area and authentication area individually have plural areas, and each area in the non-authentication area has a corresponding area in the authentication area, wherein the area information storage stores plural combinations of sizes of areas included in the non-authentication area and the authentication area, wherein the host interface receives specifying information indicating one combination, from the accessing device, and wherein the area size setter selects the one combination from the plural combinations stored in the area information storage according to the received specifying information, and sets the size of each area in the non-authentication area and authentication area according to the selected combination.

8. An accessing device for writing and reading data to and from an information recording medium storing data and having an authentication area which allows access only when authentication is successful and a non-authentication area which allows access regardless of a result of the authentication, the non-authentication area and authentication area respectively having plural areas, the accessing device comprising:

a slot configured to load the information recording medium, the information recording medium having plural areas in which data is managed by independent file systems and further storing information about a ratio of a size of an area included in the non-authentication area to a size of a corresponding area included in the authentication area, as the setting condition to set each size of the plural areas; and a file system controller configured to control the file systems established on the information recording medium loaded in the slot, wherein the file system controller transmits a command for requesting area size setting to the information recording medium to set a size of each area in the information recording medium, and specifies the size of area in the information recording medium, and, in order to set the size of each area of the information recording medium, the file system controller transmits a size of one area in either one of the non-authentication area and the authentication area, to the information recording medium.

9. The accessing device according to claim 8, wherein the file system controller transmits only a discrete value for the size of an area to be specified for setting the size of each area of information recording medium.

10. The accessing device according to claim 8, wherein the file system controller sets the size of the one area to be transmitted for setting each area of the information recording medium to be larger than a total size of inaccessible blocks, which is calculated by an entire size of the information recording medium or the size of each area in the information recording medium and a rate of accessible blocks.

11. An accessing device for writing and reading data to and from an information recording medium which stores data, the information recording medium having an authentication area which allows access only when authentication is successful and a non-authentication area which allows access regardless of a result of the authentication, the non-authentication area and authentication area respectively having plural areas, the accessing device comprising:

a slot configured to load the information recording medium, the information recording medium has plural areas in which data is managed by independent file systems and further stores information about a ratio of a size of an area included in the non-authentication area to a size of a corresponding area included in the authentication area, as a setting condition to set each size of the plural areas in the information recording medium; and a file system controller configured to control the file systems established on the information recording medium loaded in the slot, wherein the file system controller transmits a command for requesting area size setting to the information recording medium to set the size of each area in the information recording medium, and, in order to set the size of each area of the information recording medium, the file system controller transmits the size of each area in either one of the non-authentication area and authentication area, to the information recording medium.

12. An accessing device for writing and reading data to and from an information recording medium storing data and having an authentication area which allows access only when authentication is successful and a non-authentication area which allows access regardless of a result of the authentication, the non-authentication area and authentication area respectively having plural areas, the accessing device comprising:

a slot configured to load the information recording medium, the information recording medium having plural areas in which data is managed by independent file systems, and setting each size of the plural areas in the information recording medium by using a setting condition, which is a composition ratio of each area in the non-authentication area or the authentication area; and a file system controller configured to control the file systems established on the information recording medium loaded in the slot, wherein the file system controller transmits a command for requesting area size setting to the information recording medium to set the size of each area in the information recording medium, and, in order to set the size of each area of the information recording medium, the file system controller transmits the size of each area in either one of the non-authentication area and the authentication area, to the information recording medium.

13. An accessing device for writing and reading data to and from an information recording medium storing data and having an authentication area which allows access only when authentication is successful and a non-authentication area which allows access regardless of a result of the authentication, the non-authentication area and authentication area respectively having plural areas, the accessing device comprising:

a slot configured to load the information recording medium, the information recording medium having plural areas in which data is managed by independent file systems and further storing plural combinations of sizes of areas in the non-authentication area and authentication area; and a file system controller configured to control the file systems established on the information recording medium loaded in the slot;

wherein the file system controller transmits a command for requesting area size setting to the information recording medium to set the size of each area in the information recording medium, and, in order to set the size of each area of the information recording medium, the file system controller transmits information for selecting one combination from the plural combinations stored in the information recording medium, to the information recording medium.

14. An area setting method of an information recording medium having plural areas storing data, the information recording medium has an authentication area which allows access by an accessing device only when authentication is successful, and a non-authentication area which allows access by the accessing device regardless of a result of the authentication, and the non-authentication area and authentication area have plural areas respectively, the area setting method comprising:
storing, in a data storage, a size of the non-authentication area of the information recording medium and a ratio of a size of the area in the non-authentication area to a size of the corresponding area in the authentication area, as a setting condition the plural areas of the information recording medium are managed by mutually independent file systems;
receiving, by a command receiver, from outside of the information recording medium, a command for requesting setting of a size of each area in the information recording medium, and a size of one area in one of the non-authentication area and the authentication area;
setting a size of each area in the information recording medium based on the setting condition, according to the received command, the setting comprising:
determining a size of each area of the non-authentication area and the authentication area on the basis of the received size of one area and the ratio; and
setting the size of each area of the information recording medium on the basis of the received size and determined size.

15. The area setting method according to claim 14, wherein only discrete values are allowed as the size of each area to be set.

16. The area setting method according to claim 14, wherein the size of each area in the information recording medium is set to be larger than a total size of inaccessible blocks, in which the total size of inaccessible blocks are calculated from an accessible block rate and an entire size of the information recording medium or a size of each area of the information recording medium.

17. An area setting method of an information recording medium having plural areas storing data, wherein the information recording medium has an authentication area which allows access by the accessing device only when authentication is successful, and a non-authentication area which allows access by the accessing device regardless of a result of the authentication, and the non-authentication area and authentication area have plural areas respectively, the area setting method comprising:
storing, in a data storage, a size of the non-authentication area of the information recording medium, and a ratio of a size of the area in the non-authentication area to a size of the corresponding area in the authentication area, as a setting condition, the information recording medium having plural areas storing data, which are managed by mutually independent file systems;
receiving, by a command receiver, from outside of the information recording medium, a command for requesting setting of an area size of the information recording medium and a size of each area in one of the non-authentication area and the authentication area;
setting a size of each area in the information recording medium based on the setting condition, according to the received command, the setting comprising:
determining the size of each area of the non-authentication area and the authentication area on the basis of the received size of each area and the ratio; and
setting the size of each area of the information recording medium on the basis of the received size and determined size.

18. An area setting method of an information recording medium having plural areas storing data, wherein the information recording medium has an authentication area which allows access by the accessing device only when authentication is successful, and a non-authentication area which allows access by the accessing device regardless of a result of the authentication, and the non-authentication area and authentication area have plural areas respectively, the area setting method comprising:
receiving, by a command receiver, from outside of the information recording medium, a command for requesting setting of an area size of the information recording medium and a size of each area in one of the non-authentication area and the authentication area, the plural areas of the information recording medium are managed by mutually independent file systems;
setting a size of each area in the information recording medium based on a predetermined setting condition, according to the received command, the setting comprising:
calculating a composition ratio of each area of the non-authentication area or the authentication area based on the received size of each area;
determining a size of each area in an other of the non-authentication area and the authentication area on the basis of the calculated composition ratio, and
setting the size of each area of the information recording medium on the basis of the received size and determined size.

19. An area setting method of an information recording medium having plural areas storing data, wherein the information recording medium has an authentication area which allows access by the accessing device only when authentication is successful, and a non-authentication area which allows access by the accessing device regardless of a result of the authentication, and stores plural combinations of sizes of areas in the non-authentication area and the authentication area, the area setting method comprising:
receiving, by a command receiver, from outside of the information recording medium, a command for requesting setting of an area size of the information recording medium and specific information for selecting one combination from the plural combinations, the plural areas of the information recording medium are managed by mutually independent file systems,
setting a size of each area in the information recording medium based on a predetermined setting condition, according to the received command,
selecting the one combination from the stored plural combinations according to the received specific information, and
setting the size of each area in the information recording medium according to the selected combination.

* * * * *